United States Patent [19]

Goldberg

[11] Patent Number: 4,672,553
[45] Date of Patent: Jun. 9, 1987

[54] ORDER PROCESSING METHOD AND APPARATUS

[75] Inventor: Stanley Goldberg, Roseland, N.J.

[73] Assignee: Goody Products, Inc., Kearny, N.J.

[21] Appl. No.: 854,080

[22] Filed: Apr. 17, 1986

Related U.S. Application Data

[63] Continuation of Ser. No. 463,487, Feb. 3, 1983, abandoned.

[51] Int. Cl.[4] .......... G06F 15/20; G06G 7/48; B65G 43/00; B65G 37/00
[52] U.S. Cl. .................. 364/478; 414/134; 414/136; 364/479; 364/900; 198/349; 235/383
[58] Field of Search .......... 364/200, 900, 478, 479, 364/460, 476; 414/134, 135, 136; 198/349, 350, 502, 503, 856; 209/552, 509, 564, 559, 565, 566; 235/383, 385, 424, 425; 221/1

[56] References Cited

U.S. PATENT DOCUMENTS

| | | | |
|---|---|---|---|
| 2,272,353 | 9/1966 | Wilder | 214/11 |
| 3,144,958 | 8/1984 | Gumpertz | 221/7 |
| 3,252,596 | 5/1966 | Beecher et al. | 364/479 X |
| 3,541,309 | 11/1970 | Cutter | 186/55 X |
| 3,640,384 | 2/1972 | Del Rosso | 209/74 M |
| 3,645,392 | 2/1972 | Chittenden et al. | 209/74 M |
| 3,647,026 | 3/1972 | Alexander et al. | 198/349 X |
| 3,661,284 | 5/1972 | Traube | 214/152 |
| 3,696,946 | 10/1972 | Hunter et al. | 214/11 R |
| 3,725,867 | 4/1973 | Jordan | 340/172.5 |
| 3,743,090 | 7/1973 | Brown et al. | 209/566 X |
| 3,785,510 | 1/1974 | Grootboer | 214/11 C |
| 3,786,939 | 1/1974 | Habegger et al. | 214/11 A |
| 3,803,556 | 4/1974 | Duffy | 364/900 |
| 3,895,716 | 7/1975 | Ugo | 364/900 X |
| 3,955,678 | 5/1976 | Moyer | 209/564 |
| 3,983,988 | 10/1976 | Maxted et al. | 198/365 |
| 3,987,429 | 10/1976 | Manduley et al. | 364/478 |
| 4,044,897 | 8/1977 | Maxted | 214/11 |
| 4,088,237 | 5/1978 | Brown | 214/152 |
| 4,174,774 | 11/1979 | Bourgiois | 198/457 |
| 4,181,947 | 1/1980 | Krauss et al. | 364/478 |
| 4,189,273 | 3/1978 | Soderstrom et al. | 414/285 |
| 4,214,663 | 7/1980 | Schopp et al. | 198/349 X |
| 4,239,434 | 12/1980 | Gannon | 414/136 |
| 4,239,435 | 12/1980 | Weiss et al. | 414/134 X |
| 4,336,589 | 6/1982 | Smith | 364/478 X |
| 4,338,671 | 7/1982 | Korytkowski et al. | 364/478 |
| 4,373,185 | 2/1983 | Mills et al. | 364/478 |
| 4,432,458 | 2/1984 | Daboub | 209/564 |
| 4,472,783 | 9/1984 | Johnstone et al. | 364/478 X |
| 4,514,816 | 4/1985 | Ollus et al. | 364/478 X |

Primary Examiner—Gary V. Harkcom
Assistant Examiner—Jon D. Grossman

[57] ABSTRACT

In the disclosed method and apparatus, item-identifying codes of packages loaded onto a conveyor are scanned and, based on comparisons with the items in a group of orders stored in a computer, the packages are distributed to corresponding order-assembly lanes while account is kept of the distributed packages. In a preferred embodiment, one code-reader is located at the supply end of the conveyor system and packages are tracked in the computer for delivery to respective order-assembly lanes, deducting from order requirements at the time of scanning and correcting for the deductions if timely deliveries are not effected. Where belt conveyors are used and "slip" of a package behind its theoretical maximum travel speed may occur, package travel is monitored and operation of the system is halted in case of excessive delay of a package along any travel segment. The actual "slip" of each tracked package occurring along each segment of the conveyor system, unless excessive, is erased in monitoring travel of the packages along each succeeding conveyor segment, thereby avoiding tracking complications due to pyramiding of tolerable sequential "slips" along successive segments of the conveyor system.

48 Claims, 22 Drawing Figures

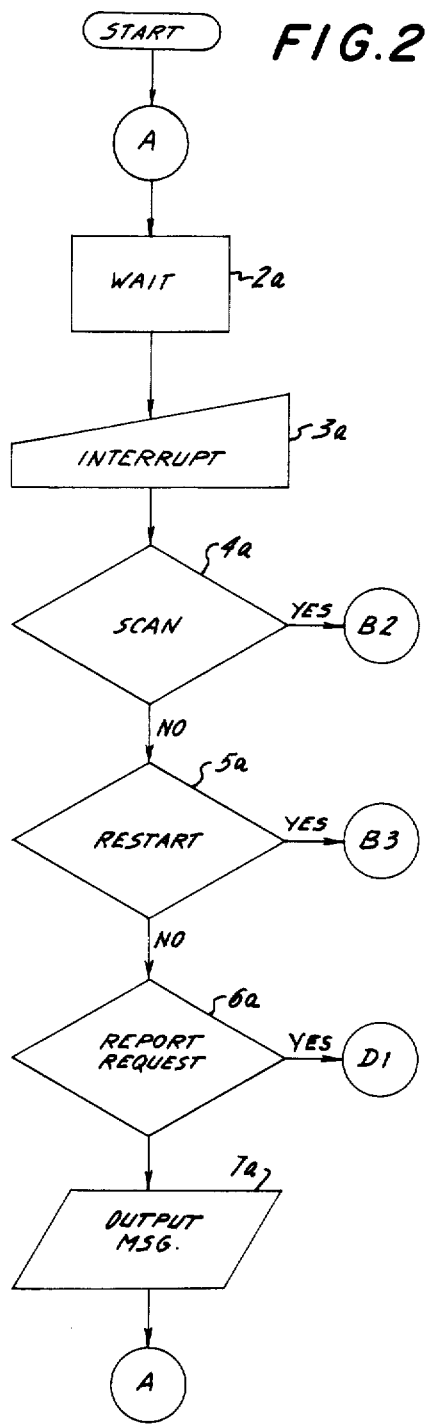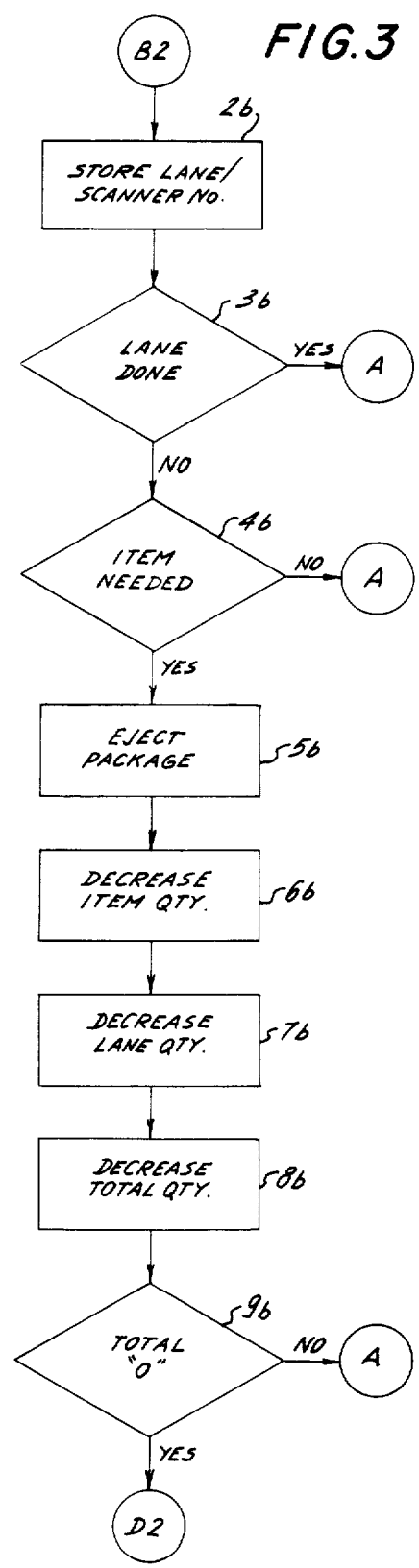

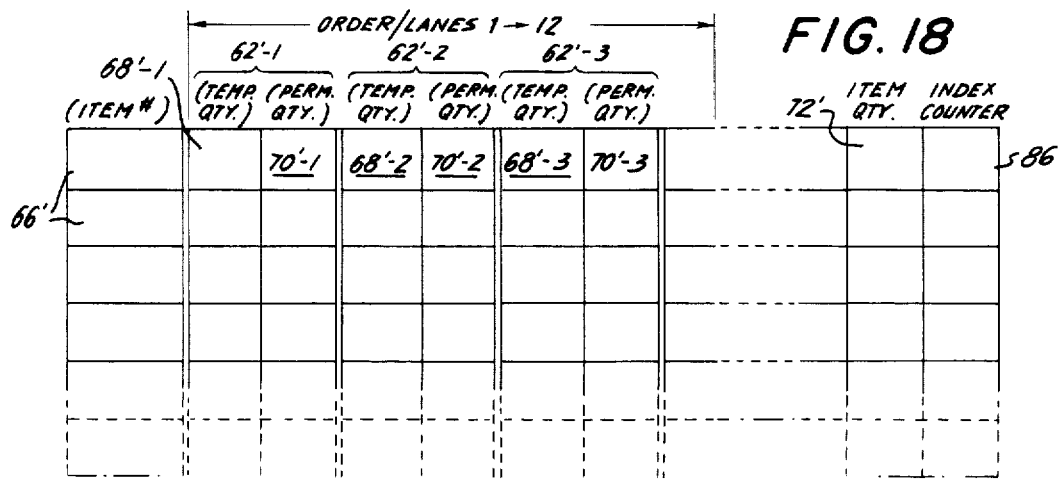
FIG. 18
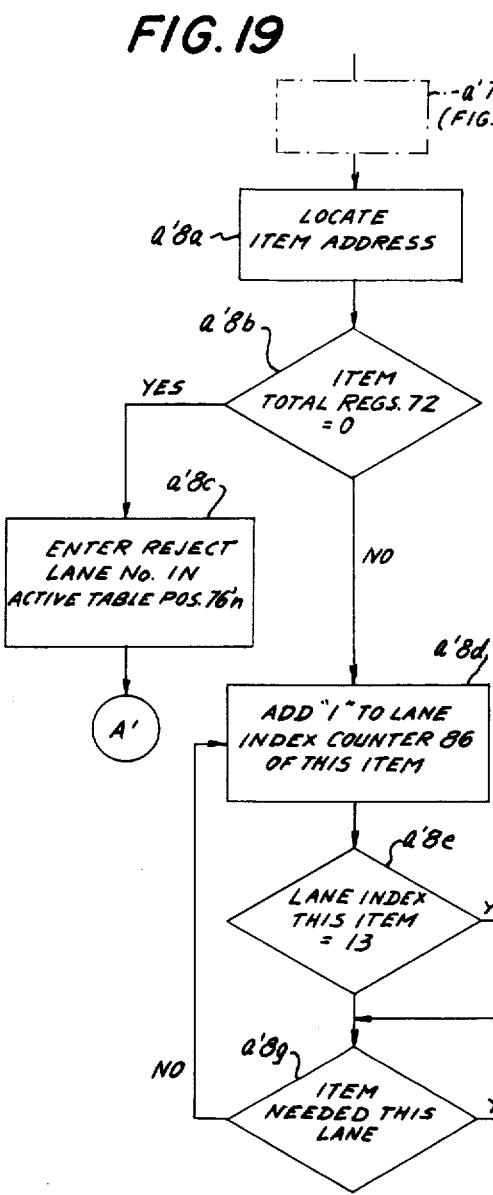
FIG. 19
FIG. 20A  FIG. 20C
FIG. 20B

ORDER PROCESSING METHOD AND APPARATUS

This application is a continuation of application Ser. No. 06/463,487 filed Feb. 3, 1983, now abandoned.

The present invention relates to apparatus and a method for assembling merchandise needed to fill orders.

In known systems, mail is sorted in accordance with their postal zones and baggage is sorted in accordance with labels showing airline destinations. That sorting of mail and baggage is controlled strictly in accordance with the designations of their destinations. In such systems, all units bearing a common designation are routed to a common collection site, and there is no limit to the number of units bearing a given identification that are routinely delivered to any one collection site.

Order-assembling apparatus is also known wherein a label is applied to each item needed to fill an order as the item is picked from stock. The label has a machine-readable code identifying the order for which the item was picked. The collected items bearing newly applied order-code labels are distributed by a sorting conveyor to order assembly locations corresponding to the order codes.

Apparatus is also known for picking a variety of items from corresponding supplies under automatic control and routing the merchandise all the way from the picking points to respective order-assembly sites. Such apparatus requires guide paths from the picking points to the order-assembly sites. That apparatus tends to be specialized to handling of items of uniform size and shape. Also, the whole system must be tightly integrated, all of which seriously restricts the application of such a system.

An object of this invention resides in providing novel, highly effective automated apparatus and a novel method for assembling items needed to fill orders.

A further object of the invention resides in providing a novel method for assembling items to fill orders, and in providing novel order-assembling apparatus, to avoid the requirement of labeling each item with a designation of an order or an assembly location, and generally to avoid or ameliorate many of the complications and limitations of known order-assembling apparatus.

The novel automated order-assembling apparatus is organized to execute a novel order-filling method. In that method, orders of a group are processed concurrently. A computer is utilized containing entries representing the orders and the items in each order, and the quantity of each item in each of the orders. A computer-controlled sorting conveyor is used having discharge lanes ending at assembly sites or order-assembly locations assigned to the respective orders. Packages of various items needed for filling the orders are loaded on to the sorting conveyor. The term "package" is used in a broad sense to signify a unitary article comprising an item or plural items held together, even when no wrapping material is used. Each unit of the "items" listed in an order has characteristics by which it may be recognized for what it is. The term "characterization" is used to identify items in this sense, so that all packages of any particular item listed in any of the orders of a group, and units of that item listed in the orders have the same characterization, while the various different items listed in the orders have mutually different characterizations. A package has the same characterization as the item or items it comprises so that multiple items of a package must be alike.

The characterization of a package is normally represented by an identifying designation applied to the package; and in the illustrative embodiments of the invention detailed below, machine-readable indicia—especially bar codes—are utilized to provide the computer with characterizations of the packages.

Packages of various items are loaded successively onto the sorting conveyor and their characterizations are communicated to the computer. The packages are selectively distributed in dependence jointly on the package characterizations and on the characterizations of the items in the orders and their respective quantities stored in the computer. When the requirement in any order for any particular item is satisfied, no more units of that item are discharged at that corresponding order-assembly location.

In the present invention, there is no need for preliminary labeling or other preparation of items or packages of merchandise to show destinations or customers. Notably, any given package may be delivered to any order-assembly location. Discharge of any particular item at an order-assembly location depends on recognition of what that item is as represented by its characterization, and on requirements of the corresponding order for items having that characterization.

The computer keeps account of the items in each of the orders versus the items to be delivered to the corresponding order-assembly locations. The number of units of a given item required for a given order are delivered to the related order-assembly location. Thereafter, no further units of that item are delivered to the order-assembly location allocated to that order. Dependably accurate delivery is established of the quantities of each item in any given order at its order-assembly location. If too few packages of any item are provided to fill all the orders, the accounting in the computer reveals the shortages. The apparatus has the capability of producing shipping invoices showing, with remarkable dependability, the items actually assembled for each order both when the order is filled and when there are shortages.

Items may be loaded onto the sorting conveyor which are not needed for any of the group of orders being processed. Any such mistakenly loaded items are routed to a reject location. In concept, the characterization of each item could be entered into the computer manually each time an item is loaded onto the sorting conveyor. However, for advantages of speed and accuracy, entry of the item characterization is performed automatically by code-reading or scanning devices. In one illustrative embodiment of certain aspects of the invention, the function of entering the item characterization is performed automatically by a scanner at each of a number of conveyor discharge lanes.

An additional feature of the invention is represented in another illustrative embodiment and modifications thereof detailed below, wherein the characterizations of the items are derived by a single scanner at a common location on the sorting conveyor, the computer recognizes the item and allocates it to a specific order, and the computer tracks each item for discharge at the proper order assembly location. Use of a single scanner at a common location in such apparatus can represent a significant cost saving over a like system having a scanner at each of several discharge locations, especially where a laser type of scanner is needed.

A further object of the invention resides in providing apparatus of the foregoing type that does not depend on conveyors of the kind that force each loaded item to advance positively with the conveyor. The cost of the apparatus can be reduced and the apparatus becomes much more flexible through reducing restrictions on the kind of conveyor that is suitable. Separate belt conveyors and general-purpose diverters are assembled in a preferred illustrative embodiment, and the apparatus is nonetheless highly effective in using a single scanner at a common portion of the sorting conveyor and tracking the identified items carried by the conveyor. Substantially different degrees of slip may develop with various items having different weights, sizes, contours and proportions. The term "slip" refers here to a lag of the items in relation to the speed of the conveyor. Greater flexibility of the sorting conveyor is realized by incorporating a novel tracking system that accommodates a latitude of slip variations. Where the sorting conveyor has separate sequential belt conveyors and diverters having individual drive motors, the allowance for slip can also include unplanned deviations of their speeds. The tracking system precludes accumulation of slip along the length of the sorting conveyor. This is achieved by checking each segment along the sorting conveyor for slip and in effect erasing the slip occurring in that segment if it is within an allowable range, and initiating a new test for slip along each succeeding conveyor segment.

The foregoing and other objects, features and advantages of the invention in its various aspects will be best appreciated from the following detailed description of three illustrative embodiments shown in the accompanying drawings and modifications thereof.

In the drawings:

FIGS. 2–6 are a composite flow-shart of the apparatus of FIG. 1;

Figure 7:
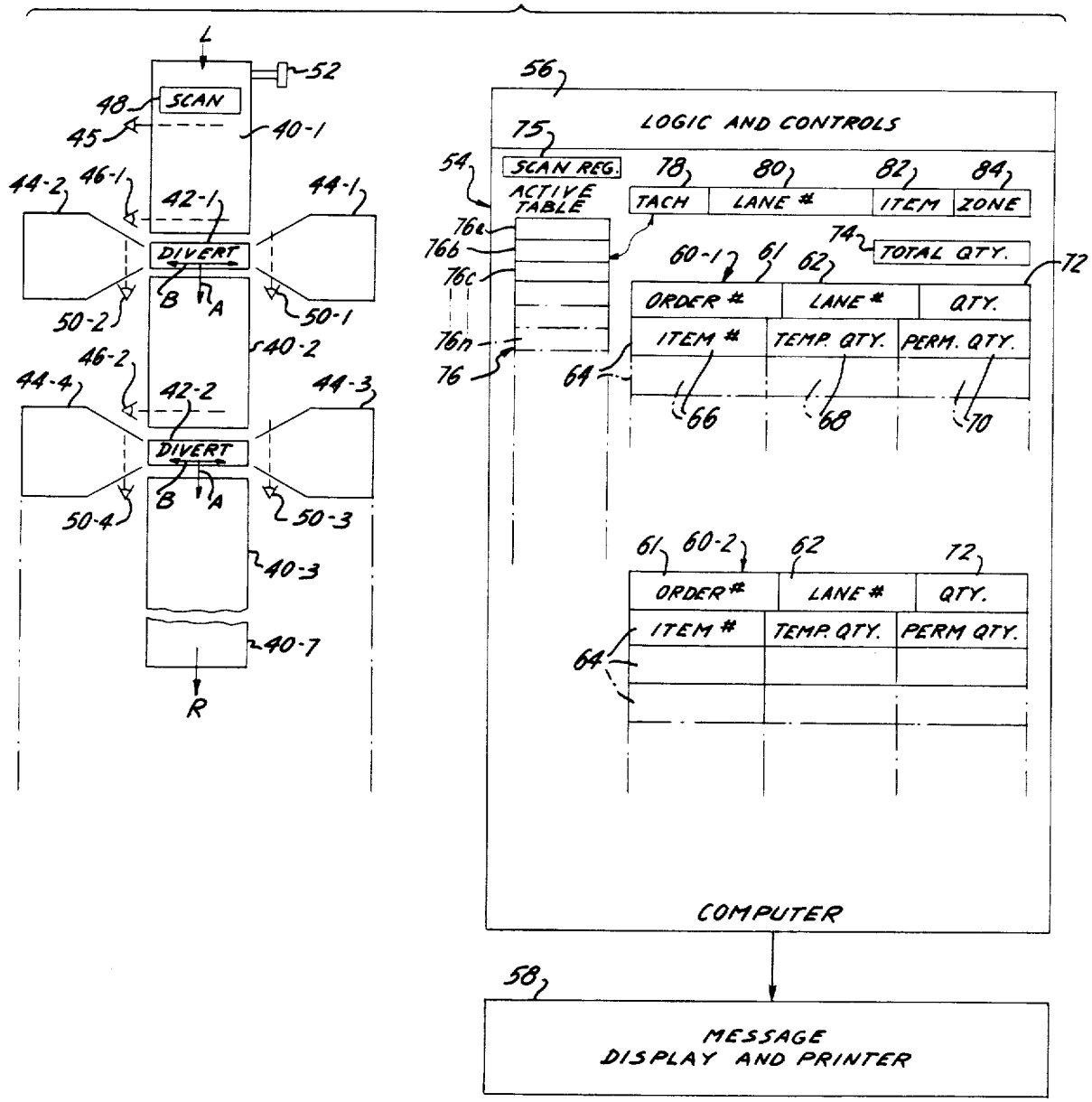
FIG. 7 is a diagrammatic representation of another novel order-assembling apparatus, as a presently preferred further embodiment of certain features of the invention common to that of FIGS. 1–6 and of certain additional features.
Figure 8:
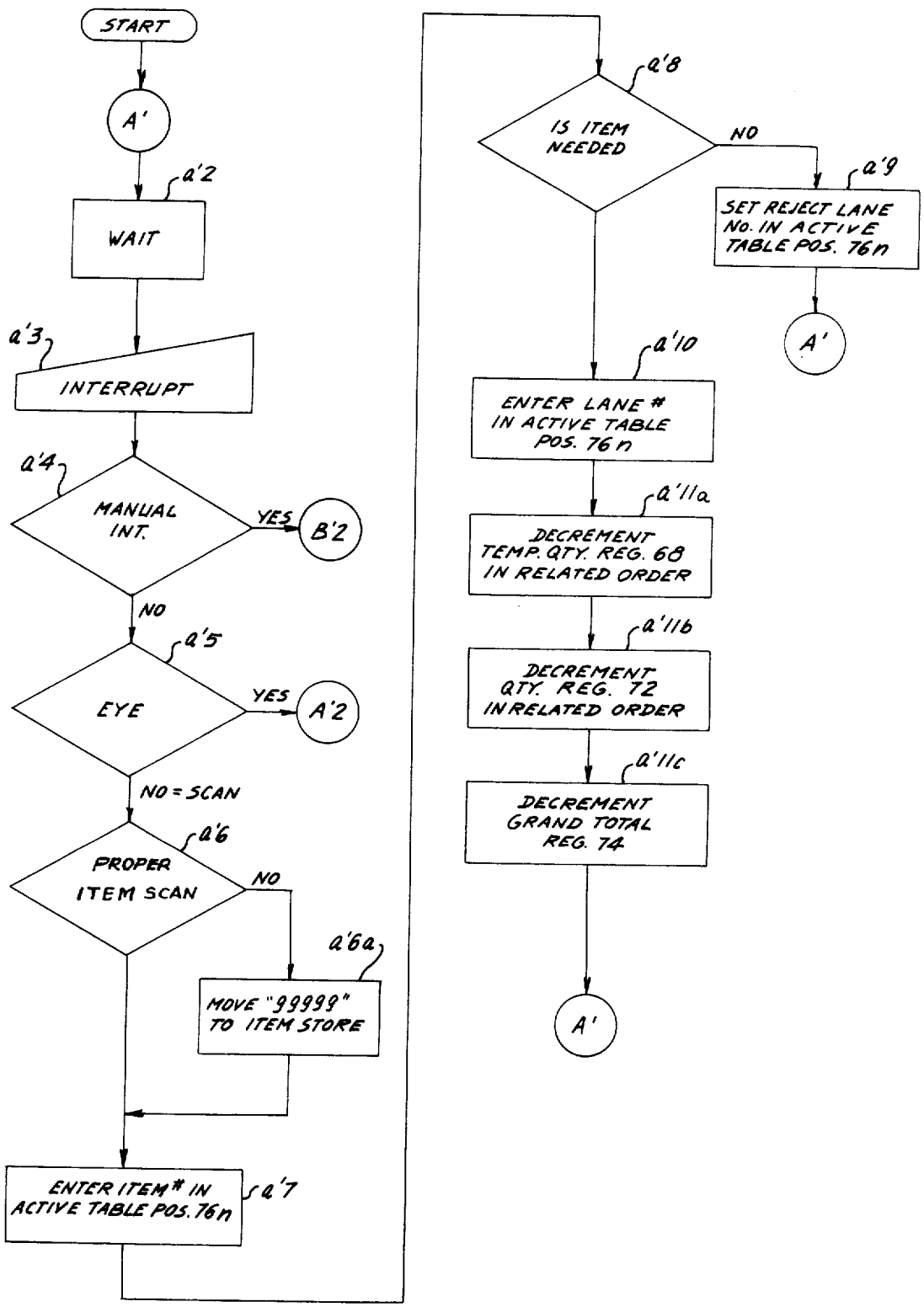

FIGS. 8–17 constitute a composite flow chart for the apparatus in FIG. 7;

FIG. 18 is a diagram representing a modified organization of the group of orders in the computer of FIG. 7;

FIG. 19 is a flow chart of a partial modification of the flow chart of FIG. 8 to adapt the computer to the data format of FIG. 18; and FIGS. 20A, B and C are representations of the tach entries of the example of FIGS. 7–17 and two alternative forms of tach entry.

In a preparatory routine, a computer is used to accumulate the totals of each of the items needed to fill all of the group of orders being processed concurrently. A list of all such items and their totals is prepared for use as a "pick list". The items are picked from stock and collected for loading in any random order onto any of the sorting conveyor systems described below. Picking and transfer of the packages may be done manually or by mechanized apparatus, as may prove expedient. Some items on order might be unavailable. Also, some of the picked items might be picked in error, either because they are not needed for any of the orders or because too many of a given item were picked. Such shortages and picking errors no not interfere with the routine operation of the novel systems in distributing the properly picked items.

The term "package" is used in this specification in a broad sense to signify any entity that is handled separately, such as a box, a bag or a carton, as well as multiple articles secured together as an entity. The term "package" will also serve as an abbreviated reference to an equivalent separately handled entity even if it may not have a wrapping. The sorting conveyor discharges the packages at various "lanes", a term here used interchangeably with the corresponding order-assembly "sites" or "locations".

In the following description, the invention is discussed in its primary application to the commercial activity of assembling merchandise to fill purchasers' orders. However, the use of "order" is not intended as limiting but rather to facilitate understanding since analogous applications of the invention may be envisioned as in assembling kits of diverse articles.

FIGS. 1–6 show an illustrative embodiment of certain features of the invention. At the left of FIG. 1 there is a largely diagrammatic plan view of apparatus for handling merchandise, including an endless conveyor 10 having a series of tilt trays 10a for transporting items of merchandise bearing product-identifying codes from the loading end L along a path that passes a series of eject devices 12-1, 12-2, 12-3, etc. Each tilt tray is pivoted at the right side of conveyor, and each tray normally remains horizontal as it travels. Each eject device 12-1, 2, 3 . . . has a mechanism to raise the end of a tray at the left side of the conveyor for tilting the tray. A package on a tilted tray is diverted from the conveyor at order-assembling lanes 14-1, 14-2, 14-3, etc. which may comprise a sloping ramp leading to a packing table below the level of trays 10a. Packages that are not diverted to any of the order-assembly lanes are discharged at the reject-collection end R of the conveyor.

In advance of each eject device, there is a code reader 16-1, 16-2, 16-3, etc., for example a high-speed laser scanner. To minimize the "on" time of each scanner (for conserving its life) an electric eye 18 is advantageously located to sense the trays approaching each scanner for the presence of a package. The eye can, indeed, be part of the scanner.

A computer 20 with its logic, interface equipment and controls 20a, receives input from scanners 16 and controls eject devices 12. Output message apparatus 21 is also provided, such as a CRT display and/or printer. Of course, all the collateral provisions appropriate to performing the operations represented in the flow charts of FIGS. 2–6 are included in the apparatus. For example, the scanner or the computer incorporates a register 23 for storing a scanned item number until it is utilized, with logic to reset the scanned-number register before the next scan.

Computer 20 includes a number of order entry tables 22-1, 22-2 etc., one for each of the orders being processed concurrently. In preparation for a cycle of operation, tables 22 are loaded with data representing respective orders and with other data useful in processing the orders. Registers 24 are loaded with the order numbers, associated with fixedly registered lane or eject station numbers, each order being assigned to a respective lane.

Each order entry table includes a separate item entry position 26 for each item in order. Each such position comprises an item register 28, a temporary quantity register 30 and a permanent quantity register 32.

The entries in registers 28 and the output of scanners 16 both signify items in the orders, and may be called "item characterizations" and "package characterizations" as discussed above.

If the entire group of orders is reviewed, it will usually be found that many of the items in one order also appear in other orders of the group. In that case, the same item characterizations will appear in a plural order tables.

At the time of order entry, the same quantities are entered into both registers 30 and 32 for each item. The permanent registers 32 enable the computer to be used in due course for issuing a formal shipping invoice showing the quantity of each item on order, while the temporary register 30 is used to keep account of the quantity of that item that is needed at any time for completing the order, i.e., the net requirement for that variety of item. When the number in the temporary register is reduced to zero, no more of that item is needed for that order. Moreover, for issuing a shipping invoice, the temporary register shows the shortages of each of the items in the order and the permanent register shows the quantity on order; and the computer is programmed to take the difference between these two registers to show the supplied quantities, both for the shipping invoice and for temporary status reports that may be produced by the computer on command during the order-assembly operation.

An order quantity register 34 is advantageously included in each order table 22, being the total of all quantities in registers 30 of that order table. Register 35 provides the total of all the items in the group of orders.

The following is an overview of the system operation in general terms as an introduction to the description of the flow charts in FIGS. 2–6.

Orders of a group are processed concurrently. The pick-list of items is collected at the loading end L of the conveyor for filling all of the orders. The collected merchandise may involve some items that are not needed, and there may be deficiencies. Packages are placed on the trays 10a of the conveyor while it is in operation. Each package bears a bar-code item characterization or other machine-readable code. When a package code has been scanned, the code is registered in temporary storage. Reset of the code storage occurs after it has been utilized in the computer. Multiple codes from the various scanners 18 may be in storage concurrently but they are handled rapidly as sequential interrupts in computer operations, by well-known techniques. Each package that is scanned is ejected at the first lane where it is needed in filling the order assigned to that lane. If the order assigned to that lane does not call for that item or if its needs for that item have been filled, the ejector 12 of that lane is not activated.

Any item that is not called for by any order and an oversupply of any item results in that item being discharged at the reject end R of the conveyor.

From the foregoing, it is apparent that the ejection or diversion of any item does not depend on correspondence between an item code and a discharge lane number. Rather, the computer determines the ejection; each eject lane receives items bearing many different codes, and items bearing the same item-characterization code may be delivered at several lanes. The ejection lanes correspond not to an item but an order. When the need of any one order for a given item has been met, subsequent items of that kind travel to other scanners for selective ejection under control of the order tables.

The attendant may want to determine the status of the order-filling process when all of the collected merchandise has been loaded onto the conveyor, or at any other time. In response to a manual control entry, the computer may cause output of a message showing the extent of completion of each order and of all the orders collectively. With that information, shortages of merchandise can be noted and collected for loading onto the conveyor, or it may be found that certain items are unavailable. The attendant can decide to terminate the order-assembling process at any time.

At some point, the computer may signal completion of all of the orders, ending the order-assembly operation. Both when the order-assembling operation is completed and when it is terminated while some orders are not completed, the computer can be directed to issue shipping invoices, showing the supplied merchandise and, if desired, showing the deficiencies. To print the quantities shipped, the computer is programmed to take the difference between all registers 30 and 32. The computer is then initialized, and data for a new group of orders can be entered.

FIGS. 2–6 are, collectively, a flow chart that represents programming of computer 20 in relation to the conveyor. The manner of entering data into order tables 22 and other details of routine nature are omitted as unnecessary to an understanding of the invention.

In FIG. 2, the computer is activated at "Start" and activates "Wait" block 2a. It may be considered that the scanner 16-1 of the first lane has operated, and that a stored item code related to lane "1" is available in register 23. Such a code is recognized in block 3a as an "interrupt" and in decision block 4a as a scan at connection B2. The scanned code and the identification of lane scanner 16-1 are set (block 2b). "Lane Done" decision block 3b signals a check to be made of the amount in register 34 of table 22-1. At such time as the order assigned to lane "1" becomes filled, its register 34 reads "0". In that case, the "Lane Done" block 3b returns the program to connection A (FIG. 2), awaiting another interrupt from one of the scanners.

Assuming register 34 of table 22-1 is not at "0", control drops to the "Item Needed" block 4b, calling for comparison of the scanned and set item code with register 30 of order table 22-1. A negative result returns control to block 2a, awaiting another interrupt. If the scanned item is needed in order "1", that item is allocated to the order, order "1" thus being selected. The net requirement in the selected order for items of the same variety is to be reduced by the allocated item, and that item is to be designated for delivery to the related order assembly location. Accordingly, the program advances successively to block 5b causing the scanned item to be ejected at order assembly lane 14-1; to block 6b causing a decrease in the temporary register 30 for that item in that order table; to block 7b causing a decrease of the quantity in lane register 34; and to block 8b to cause a decrease in grand-total register 35. Decision block 9b tests register 35.

So long as any of the order remain(s) partly unfilled, program control is returned by decision block 9b to connection A (FIG. 2). However, when grand-total register 35 reaches "0", connection D2 from decision block 9b activates the sub-program of FIG. 6. Block 2d represents the collective programming for causing automatic output of the order tables to printer 21 or to an off-line process. In this case, the output would show 100% order completion. Upon completion of the output, block 3d directs resetting of the lane quantity counters 34 and the grand-total register, and block 4d directs resetting of the other registers in the order tables, an output message is printed (block 4d') and the program comes to an end at STOP.

The conveyor may be stopped deliberately or—following a report request (see below)—the conveyor may be brought to a halt as part of the program. The auxiliary controls 20a include a manual signal providing a "Restart" interrupt to block 3a (FIG. 2). This interrupt drops down to decision block 5a where the "Restart" interrupt initiates the sub-program of FIG. 4 at connection B3. Decision block 10b determines that the program is in condition to continue filling orders represented in order tables 22, dropping to block 11b to restart the conveyor and returning the program to connection A (FIG. 2). If there is no incomplete order in tables 22, block 10b shifts the program to block 12b which directs production of an interpretive output message and the program comes to an end at STOP.

The auxiliary control 20a includes a manual means for introducing a "Report Request" as an interrupt at block 3a. This input drops down to decision block 6a and to connection D1 of the subprogram in FIG. 5. During production of a report, block 5d directs stopping the conveyor and, at decision block, 6d, the nature of the report request is determined. If it is for a final report for that group of orders (though they may not be completely filled) the program shifts to the subprogram of FIG. 6 (described above) at connection D2. Where an interim status report is wanted, the interrupt drops to block 7d, outputting the order tables to show the extent of order completion and reveal shortages, followed by return of the program to connection A awaiting a new interrupt.

The apparatus of FIGS. 1-6 is capable of performing automatically an order-assembly operation for assembling the items needed to fill several orders at respective order-assembly locations under control of the computer's order tables. That apparatus is amenable to many modifications, some of which are found in the embodiment of FIG. 7. For example, by adopting an appropriate form of diverter, the apparatus of FIG. 1 can be modified to supply order-assembly lanes at both sides of the conveyor at each scan-and-divert location. Moreover, as described in detail below (as a modification of FIGS. 7-17) the several scanners shown in FIG. 1 can be replaced by a single scanner at a common point in the path of all the packages. A tracking system like that of FIGS. 7-17 can be used to coordinate the single scanner and the ejectors for the several order-assembly lanes, determined by the order tables. With the conveyor of FIG. 1, the tracking system of FIGS. 7-17 can be simplified to omit the test for slip of items on the conveyor (see below) because the type of conveyor in FIG. 1 compels positive travel (non-slip) of the items with the conveyor.

In the embodiment of FIG. 7, a plan view of a sorting conveyor is shown diagrammatically at the left. That apparatus includes a succession of conveyor portions, in the form of plural physically independent belt conveyors 40—each being further identified as 40-1, 40-2, etc. in accordance with its location along the route of package travel from the loading end L and along arrow A. Between each belt conveyor 40 and the next there is a selective package delivery means, here in the form of an eject mechanism 42, separately designated 42-1, 42-2, etc. in accordance with its location following belt conveyors 40-1. 40-2, etc. A practical form of this eject mechanism is described in detail in U.S. Pat. No. 4,174,774, issued Nov. 20, 1979, the details of which are incorporated herein by reference. Each eject mechanism or diverter 42 includes a series of constantly driven active rollers that tend to advance the packages along the direction of the arrows A from one belt conveyor 40 to the next and, interspersed with such active rollers there are constantly driven belts that run transverse to the conveyor path, along the arrows B. The belts operate in a "normal" direction and they are normally lowered below the level of the active rollers. In that condition of the diverters, the active rollers serve to transport packages along the path of arrows A. With appropriate input control, the eject mechanisms can be raised above the active rollers. They are controlled to operate in their "normal" direction to eject packages to the right, or in the reverse direction to discharge packages to the left. In a practical form of this apparatus, there are six diverters 42, twelve order assembly lanes 44 and seven belt conveyors 40 leading to the reject end R of the travel path.

Adjacent to each diverting device there are two order assembly lanes 44, including order assembly lanes 44-1 and 44-2 for diverter 42-1; order assembly lanes 44-3 and 44-4 for diverter 42-2, etc., for a total of twelve order assembly lanes in this example. Each order assembly lane may, for example, include a discharge ramp sloping to a packing table at a level below the package-supporting level of the diverters.

Entry electric eye 45 is located near the loading end L of the conveyor system. Diverter electric eyes 46 (46-1, 46-2, etc.) are distributed along the package path between the loading end and the reject end R. Immediately ahead of the entry electric eye 45 there is a single item-code reader, especially a laser code scanner 48 which may incorporate its own scan-initiating electric eye. Diverter electric eyes 46-1, 46-2, etc., are located at the ends of the belt conveyors 40-1, 40-2, etc., to detect the arrival of a package to diverters 42-1, 42-2, etc.

"Acknowledgement" electric eyes 50 (50-1, 50-2, etc.) are arranged partway along the order assembly lanes 44-1, 44-2, etc.

All of the belt conveyors 40 are alike, except that they may differ in path length as may be expedient in a given installation, and their electric drive motors are alike. The diverters are also alike and their motors are alike. All the motors are turned on and off in unison, and they are supplied by a common electric power line. Accordingly, the belt conveyors tend to transport packages at the same speed, which speed may vary with line voltage and with wear (unless synchronous motors are used). Some packages may move in near-synchronism with the belts while others develop a certain amount of "slip", the difference between the belt speed and the actual package speed. The package-forwarding speeds of the diverters are also alike, and they are similarly subject to "slip". The package forwarding speed of the diverters equals that of the belt conveyors and, in an example, the diverter belts move thirty percent faster. The whole system is easily installed and accommodates a wide range of package shapes, proportions and weights. Belt conveyors are inexpensive, widely available and relatively trouble-free.

One of the belt conveyors 40-1 has a "tach" (tachometer) pulse generator 52 connected to its drive mechanism, producing a train of pulses representing the belt drive and closely representing the belt speed. The tach pulses also approximate closely the speed of all other belt conveyors 40 and of the forward-feed rollers of the diverters. As will be seen, the tach pulses are part of a system that enables packages downstream of the single scan unit to be treated dependably as the packages that were scanned earlier, despite a range of "slip" and "non-slip" conditions. As is apparent, the tach pulses stop when the conveyor system is at rest.

Computer 54 with its logic and control apparatus 56 responds to the conveyor system and to manual control, and it controls the selective delivery of merchandise loaded onto the first belt conveyor 40-1; and the computer operates message output apparatus 58 (representing CRT displays and printers as well as any requisite off-line computers and printers) for issuing reports, for producing shipping papers, and for related accounting purposes.

Figure 1:
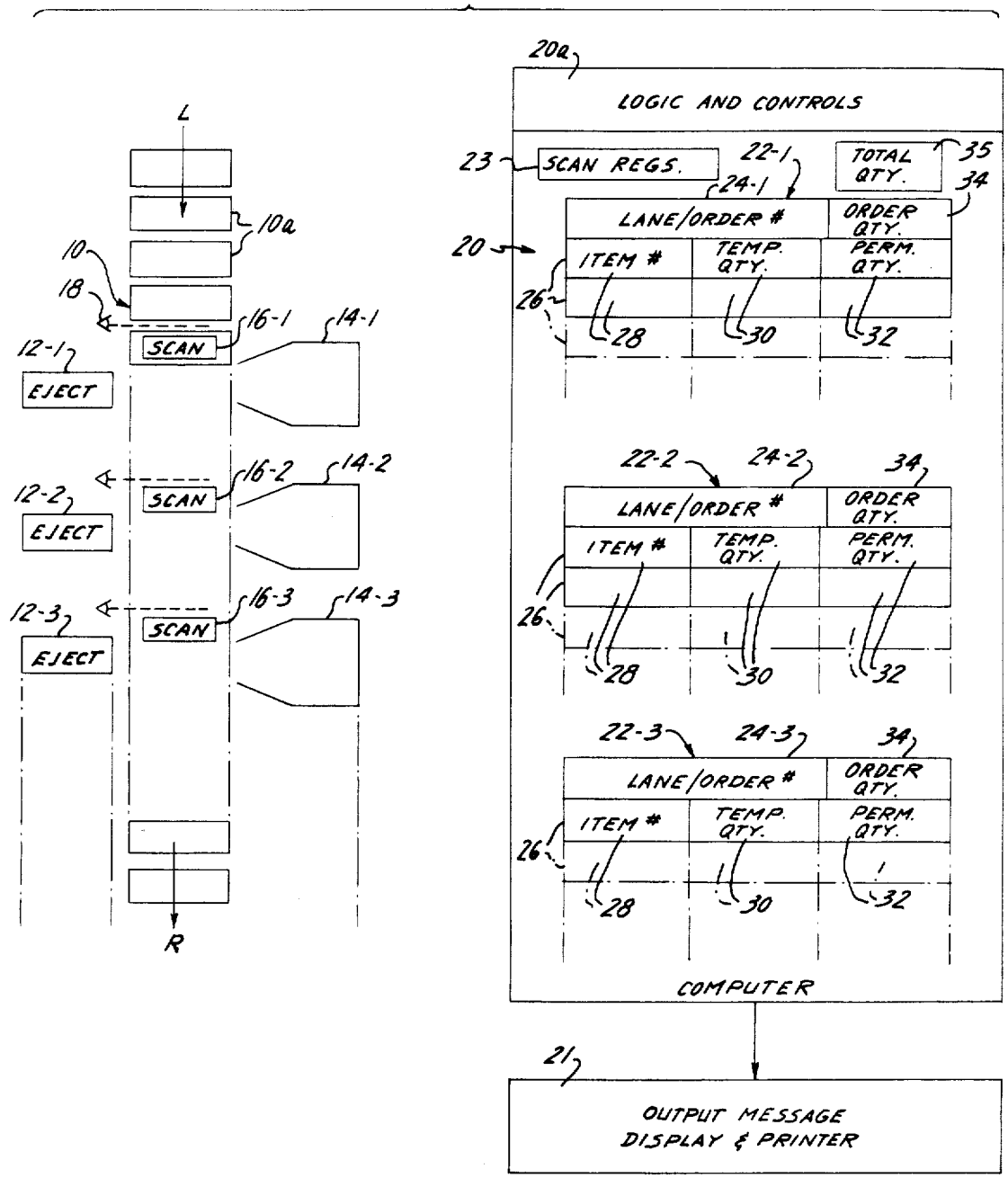
FIG. 1 is a diagrammatic representation of a novel order-assembling apparatus, as an illustrative embodiment of certain features of the invention.
Figure 4:
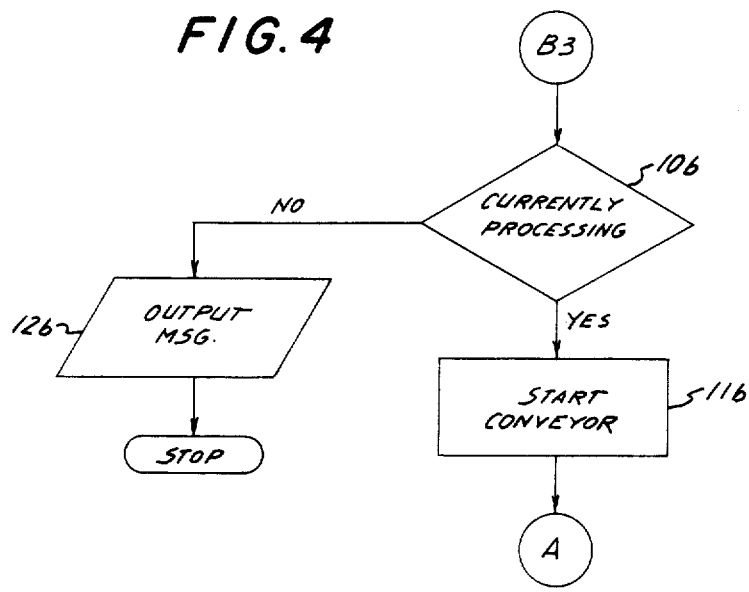
Figure 5:
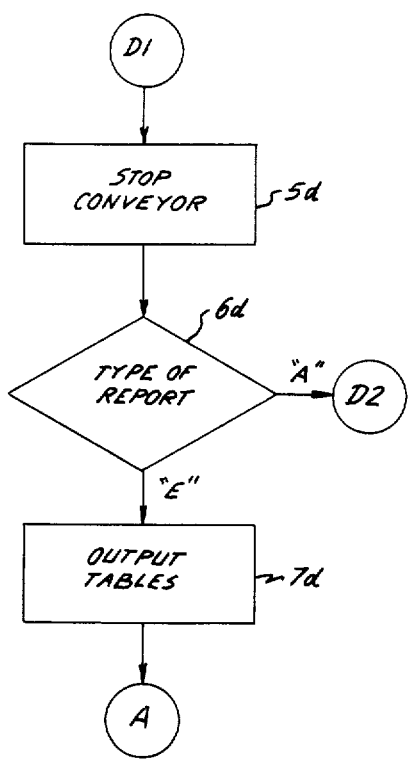
Figure 6:
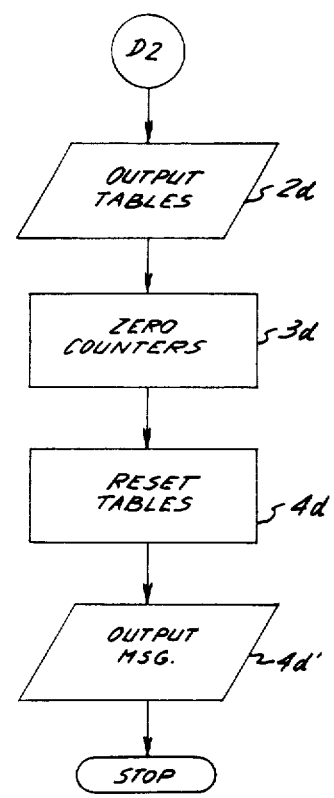

As in the apparatus of FIG. 1, the computer of FIG. 7 has a number of order tables 60 (designated 60-1, 60-2, etc.) including one such table for each other assembly lane 50. Each table has a register 61 for an order number and a register 62 for a lane number, and as many item entry positions 64 as there are items in that order. Each item entry position has an item number register 66, a temporary quantity counter 68 and a permanent quantity register 70. The item number register 66 may also be called the item characterization storage means. Additionally the computer has a quantity counter 72 for each order table, and a quantity counter 74 for the grand total of all the items of all the orders being processed together. Register 75 may store outputs of scanner 48 and may be called a means for registering the characterizations of the successively scanned packages on the conveyor. The "characterizations" provided by scanner 48 to represent packages on the conveyor and the "characterizations stored" in respective registers 66 both represent the same items in the orders.

The computer additionally includes an active table 76 providing as many positions 76a, 76b, etc. as there are packages on the conveyor system 40-1 to 40-6. The table position representing a typical package is designated "76n". Each table position includes a tachometer ("tach") register 78, an order assembly lane register 80, an item identification register 82, and zone register 84. The code number here represents a package containing one unit of a particular product. The "unit" may be a single product or multiples of a certain product, and each other then lists the quantity of each product in terms of single products, dozen-product packages, etc. This example could be changed readily to accommodate packages of various numbers of units by adding a number-of-units scanner to the item-code scanner, plus corresponding arithmetic provisions in the computer.

The general operation of the apparatus of FIG. 7 is essentially the same as that of FIG. 1. Therefore, the overview (above) of the apparatus of FIG. 1 is not repeated but is supplemented by the following comments. Generally, these comments relate to the additional features of FIG. 7, as an introduction to the detailed description of the entire system of FIG. 7 and its operation represented in the flow charts of FIGS. 8–17.

FIG. 7 includes but a single scanner 48. As compared to the several scanners of FIG. 1, this represents an important cost reduction. A program in the computer timed by tach pulses generated in time with the conveyor is used in tracking each package carried along the forward-feed path and when diverted into the order assembly lane designated by the computer for that package.

The belt conveyors 40 plus the diverters of U.S. Pat. No. 4,174,774 (supra) are inexpensive and, more significantly, that kind of package-conveying apparatus is particularly flexible, in that it dependably transports packages that vary widely in size, weight and proportions. However, such a conveyor system allows "slip" to develop between the conveyor drive and the actual travel of the packages, a problem that does not arise with positive-acting conveyors such as the tilt-tray type in FIG. 1. Tracking of the scanned packages as they are carried to the discharge lanes becomes complicated by "slip". Variations in slip that can occur with different packages are magnified where the travel path is long. The problem of variation in slip and the consequent potential for tracking errors is particularly acute where the packages are close-spaced along the conveyor. Yet close-spacing of packages on the conveyor increases the system's package-handling capacity. The apparatus of FIGS. 7–17 allows close-spacing of the packages on the conveyor, and a large package-handling capacity for the system is realized, by avoiding the impact of cumulative slip in the tracking process.

Each diverter has the selective capability of delivering packages to either of two order assembly lanes, which is a characteristic of the diverter of U.S. Pat. No. 4,174,774 (supra) as well as other diverters. That capability is utilized in the program that links the single scanner at the loading end of the conveyor system and the several diverters downstream from the scanner for selective delivery of packages needed at the order assembly lanes.

The system of FIGS. 7–17 has a further feature that could be used to advantage wherever tracking is involved and, indeed, in the apparatus of FIG. 1. For maintaining a high degree of integrity in the system, it may be important to verify actual delivery of a package at an order assembly lane as part of the order-filling process. When scanning occurs, the computer responds by directing delivery of the package to a designated order assembly lane. Confirming deliveries to the designated lanes tests the system's performance. These two factors—designation of a delivery lane and verification that delivery has occurred—combine to assure accurate accounting of deliveries to each lane and encourages reliance on the computer's item counters of each order as reliably representing each shipment.

Verification that a package has been delivered to an order assembly lane at a time when a package should be delivered can be accepted as verified delivery of a package that was scanned at the loading end of the package path; and, correspondingly, the counters in the order tables can be accepted as signifying the extent of order filling. Actual practice has vindicated reliance on this logic, without resort to more complicated apparatus.

The following particular problem arises with the single-scanner system of FIG. 7 that is equipped with means to verify delivery of a scanned item to the delivery lane designated by the computer. One, two or more packages of a particular item may be in transit along the conveyor after having been scanned and designated for delivery to a given order assembly lane. Indeed, the last unit of a particular item needed for one of the orders may have passed the scanner. No more units of that item should be designated for delivery to that particular lane. However, due to items in transit, the related order assembly lane has not received the order's requirement for that item at the time the item is scanned. The apparatus comprises provision for discontinuing any further assignment of a particular kind of item for down-stream diversion at an order assembly lane after the requirements of that order for that item have passed the scanner, yet providing correction for items-in-transit that are not verified later as having been delivered.

Conveyor 40-1 in an example is to be loaded with up to three packages between the entry eye 45 and the first diverter electric eye 46-1. This package density normally provides a safe allowance for tracking packages of widely different lengths and weights traveling between entry eye 45 and diverter electric eye 46-1, and it promotes dependable ejection of one package before the next package is conveyed onto a diverter. It is of course possible that packages might be jostled or slip so far out of position along the conveyor as to jeopardize tracking by means of the system described below. If such a condition should occur, an automatic alarm develops in the apparatus of FIGS. 7–17 to signal faulty operation or risk of faulty operation.

In a contemplated form of the novel apparatus, the alarm condition can be set up to halt the conveyor for allowing an attendant to locate and correct the cause of the alarm, and then the system could be returned to its order-assembling routine. In a further specific aspect of the invention, the "alarm" may be followed by a "flush" operation of the conveyor system, in which the diverters are disabled and the packages are all discharged at the reject end R of the conveyor. When a package passes the scanner, the temporary quantity register for that item in the related order table is reduced. However, the packages on the conveyor might not be diverted to their designated lanes. Surely "flushed" packages do not reach their intended order assembly lanes. The novel apparatus includes a safeguard against this erroneous condition. The apparatus includes means for correcting the temporary item quantity counters in the order tables for each of the items present on the conveyor system but not diverted to their designated order assembly lanes, not only in the course of a "flush" operation but if for any reason a second package is not delivered at its designated order-assembly lane. After "flush" of the conveyor, processing of the group of orders can be resumed just as if the mishap had not occurred.

The number of package-representing positions available for active table 76 should at least equal the maximum number of packages on the conveyor system from eye 45 to eye 46-6. In an example, three packages can be loaded on the first conveyor 40-1 between eye 45 and eye 46-1, and five packages may be a safe maximum along the longer segments from each eye 46 to the next. This maximum loading of the conveyor is adopted as a safe example for the package-tracking system described below and for assurance that any one package can be moved onto a diverter and ejected before the next package reaches the diverter, risking unintended ejection. With this assumption, the active table used in tracking packages for selective ejection should provide at least twenty eight (28) package-representing positions 76. The loading density can be increased with experience, and in any case more small packages than large ones can be loaded safely, correspondingly utilize more of the active table positions.

Counter 78 is "initialized" (gets an initial entry) at each eye 45 and 46-1 through 46-5. The entry is routinely decremented as the conveyors move, in time with the tach pulses, by computation means in the computer. The lane number is entered into register 80, being the same as the number in register 62 of an order table 60, identifying an order assembly site 44. The item code is entered at register 82. Finally, a number is entered into register 84 corresponding to each segment of the package path. Here, for example, $\underline{1}$ is entered in register 84 as each package passes eye 45, changed to $\underline{2}$, $\underline{3}$, . . . $\underline{6}$ as a package passes eyes 46-1, 46-2, etc., to identify the zones along the conveyor approaching the respective eyes 46-2, 3, etc.

It has been taken in an example that three spaced-apart packages may be carried safely by conveyor 40-1, and that five packages may be distributed between each eye 46 and the next. This includes the "slip" allowance and an allowance for the times needed to divert packages of various lengths. As further detail in this example, a conveyor-advance interval of $\underline{127}$ tach pulses has been adopted for the package-travel segment from entry eye 45 to diverter eye 46-1, and an interval of $\underline{205}$ pulses has been adopted for each segment from any diverter eye 46 to the next. These tach pulse intervals are subject to an allowance for slip, being plus or minus $\underline{19}$ pulses in this example. Thus, for the first segment from eye 45 to eye 46-1, the minimum interval is $\underline{108}$ pulses and the maximum is $\underline{146}$ pulses, and the intervals for the next segments marked by successive eyes 46 are a minimum of $\underline{186}$ pulses and a maximum of $\underline{224}$ pulses. These tach-pulse intervals are subject to change, based on experience. If computer speed is limited, the numbers in the foregoing example may be judiciously reduced by a factor of 2, 3 or even 6, correspondingly reducing the tach pulse frequency.

Figure 17:
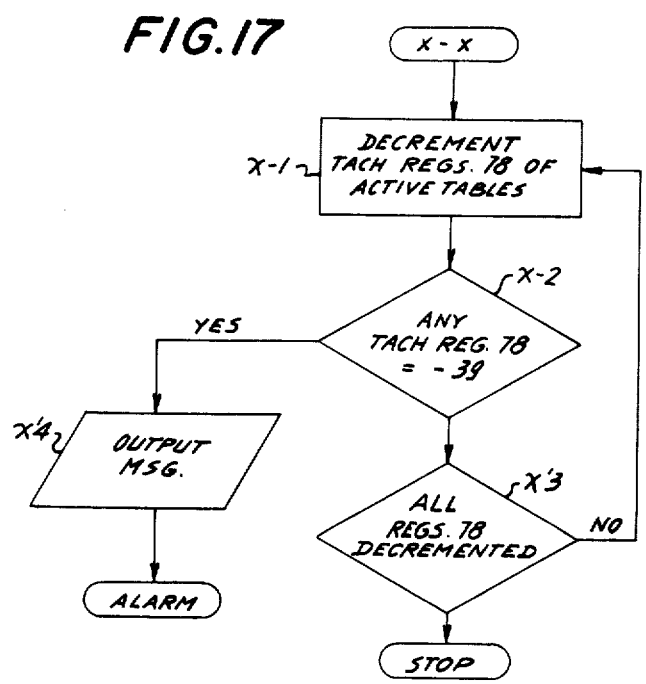

When an item is detected by eye 45, the number $\underline{108}$ is entered in register 78. The tach pulses decrement this number progressively to zero by the time a package reaches eye 46-1 without slip. If a package should arrive at eye 46-1 when this register has any reading above zero, the package arrived too soon, tracking is doubtful, resulting in ALARM. If register 78 reads $\underline{0}$ to $-\underline{38}$ (inclusive) the package arrival is timely. In this example, if the register reads $-\underline{39}$, the slip is regarded excessive, there being doubt as to proper tracking. Whenever any register 78 drops to $-\underline{39}$, the system goes into ALARM (FIG. 17).

When a package is to be ejected by any of the second through the sixth diverters, registfer 78 of that package's active table position is initialized at $\underline{187}$ as it is detected by each eye 46-1, 46-2, etc. adjacent the preceding diverter. The amount in the related register 78 (the tach register in the active table position 76n representing that package) is decremented by the computer in response to tach pulses as the package is transported from each travel detector eye to the next. For fastest transport, this register should read zero when the package reaches eye 46-2. As noted above, register 78 can read from $\underline{0}$ to $-\underline{38}$ if it arrives at any eye 46 within a "window" of allowable slip, but a positive number causes system ALARM; and $-\underline{39}$ at any time causes ALARM.

The tracking system avoids cumulative slip—accumulating the slips that may occur along the successive travel segments. Those "slips" are erased as a package starts along each new travel segment, its related tach register 78 being initialized anew, regardless of the slip that occurred (within the allowable limit) along the preceding travel segment.

In this example, the travel intervals of a package that are provided before each register 78 is initialized correspond to the distances to each of the diverters. The slip that occurs in each travel interval is erased, in effect, if it is within allowable limits. If appropriate, there could be two "slip" checks between each diverter and the next. This can be visualized by retaining eyes 45 and 46-1 through 46-6 in a systen that has but three diverters 42-2, 42-4 and 42-6. Separate sets of detectors could be used to monitor "slip" and to control the diverters, but here eyes 46 serve the dual purposes of the "slip" check and activation of a selected diverter under computer control.

Tracking of a package is performed here by checking all the active table entries of a zone as identified in register 84 to locate the one whose tach counter is 0 to −38, i.e., not more than 0. (It cannot be less than $-\overline{38}$.) That active table position is checked to see whether the package that was detected by that eye is to be diverted. If not, the zone register is incremented to be correlated with eye 46 of the next zone, etc. The package is thus identified only as the package that must be there at a given time in tach pulse counts after having been scanned initially or transferred past a previous diverter. That kind of identification has been vindicated by correct assembly of a vast number of orders using the described apparatus.

The flow charts of FIGS. 8-17 represent the operation and certain internal capabilities of the apparatus of FIG. 7. It is presumed that, at the outset, the data for a group of orders (up to twelve orders in this example) has been entered into order tables 60 and counter 74. Entering this data can be done manually or from off-line equipment. It is also presumed that packages bearing machine-readable product-identifying codes are loaded successively onto conveyor 40-1, suitably spaced apart. The packages may be loaded manually or routed by conveyors from diverse item-storage bins.

After activation of the "Start" block (FIG. 8), "Wait" block a'2 is in condition to receive interrupts. In case a new interrupt is received while a previous interrupt is being processed, the interrupts are stored and used in sequence or on a priority basis, in accordance with usual programming techniques. An interrupt at block a'3 may be a manual interrupt such as a report request or a conveyor restart directive, or the interrupt may be a signal that an eye 45, 46 or 50 has been broken, or the interrupt may be a "Scan" signifying that an item code has been received by the computer from scanner 48 or is present in register 75. The electric eyes are in conventional circuits designed to produce a momentary impulse of one polarity when an eye goes from "light" to "dark", with a resulting interrupt to the computer. Opposite-polarity impulses which may occur when the eye goes from dark to light can be utilized separately or they may be suppressed. In such a circuit, the eyes do not produce "light-to-dark" impulses during protracted dark intervals such as would occur here in case two or more packages are bunched together, not allowing light to reach the eye between the packages. These impulses enter the computer separately and are stored, until used, as identifying codes for the eyes.

Decision block a'4 tests whether the interrupt is "manual". During routine order-assembling operations, the interrupt is not "manual", so the interrupt drops to block a'5 which determines whether the interrupt is from one of many electric eyes in FIG. 7.

The interrupt at block a'3 may be neither a manual interrupt nor an "eye" interrupt. Therefore it is a "scan" interrupt and it drops to decision block a'6 to test whether the scan represents a proper item code using a routine type of validity check. If the code is valid, the interrupt drops block a'7, to enter the item number in register 82 of the next available position of active table 76. If it is not a valid item code, the interrupt drops to block a'6a to convert the invalid item code to a reject-code symbol such as "99999" which, when the interrupt drops to block a'7, is entered in item register 82 of the next available active table position. This package becomes identified with this active table position "76n" during the continuing travel of this package.

The scan interrupt drops to decision block a'8. This block represents a multiple-comparison routine to determine whether the scanned item code matches an item code 66 in any of the sequentially tested order tables 60, and if the item number is present in any tested order table, to determine whether the amount in the related temporary register 68 is greater than "0". If this determination is negative for all the order tables, it signifies a package having been loaded onto the conveyor that is not needed. In that event, the interrupt drops to block a'9 to set a "reject" symbol, e.g. "99", in lane register 80 of the active table position 76n containing the new item entry in register 82. The result is that this package will not be ejected at any order assembly lane but will be delivered to the reject end R of the conveyor system.

A positive determination in block a'8 signifies that an order table has been located having an unfilled requirement for the item represented by the scanned-and-registered item code or characterization; that order is thus selected for that item and the scanned item is allocated to that order. The interrupt drops to block a'10 directing entry of a lane number in register 80 of the related active table position 76n, the same as the lane number in register 62 of the first order table 60 that was found needing the item. For any one lane, registers 62 and 80 contain the same code, a code that includes the code of the diverter eye 46 and adds a right-or-left bit. Otherwise, each diverter-control eye 46 may be represented by two codes, one for the right lane and one for the left, and then the same codes would identify registers 62 and 80 and an eye 46. The interrupt then drops to blocks a'11a, a'11b and a'11c to decrement the quantity in temporary register 68 and in order-total register 72 of the corresponding order table 60n and to decrement grand-total register 74, returning to connection A'.

The just-scanned package then breaks entry eye 45. This is an "eye" interrupt which drops via decision block a'5 and connection A'2 to decision block a'12 (FIG. 9), to determine whether the interrupt is due to entry eye 45 or another eye. If it signifies "breaking" of the entry eye, decision block a'13 determines whether the related active table position 76n contains an entry in its register 80. There may be no entry in lane register 80 of that active table position 76n either because none of the orders required that item or because the requirements of all the orders for that item were satisfied. That package should not have been loaded onto the conveyor; but the error is harmless. If decision block a'13 determines that there is no entry in lane register 80 of an active table position 76n that contains an entry in its item register 82, the interrupt to block a'13a causes a reject code, e.g. "99" to be entered in lane register 80. For for either decision in block a'13, the interrupt then drops to block a'14. This block a'14 causes entries to be made in tach counter 78 and zone store or register 84 of the related active table position 76n. In this example, counter 78 is "initialized" by entering "108", and "1" is entered into register 84. The program then returns to connector A' to await the next interrupt.

At this point, the programming has scanned the item code of a package and recognized the package at entry eye 45; and data was entered into the active table position 76n representing a package at the entry eye, being carried on belt conveyor 40-1 toward the first diverter eye 46.

Figure 9:
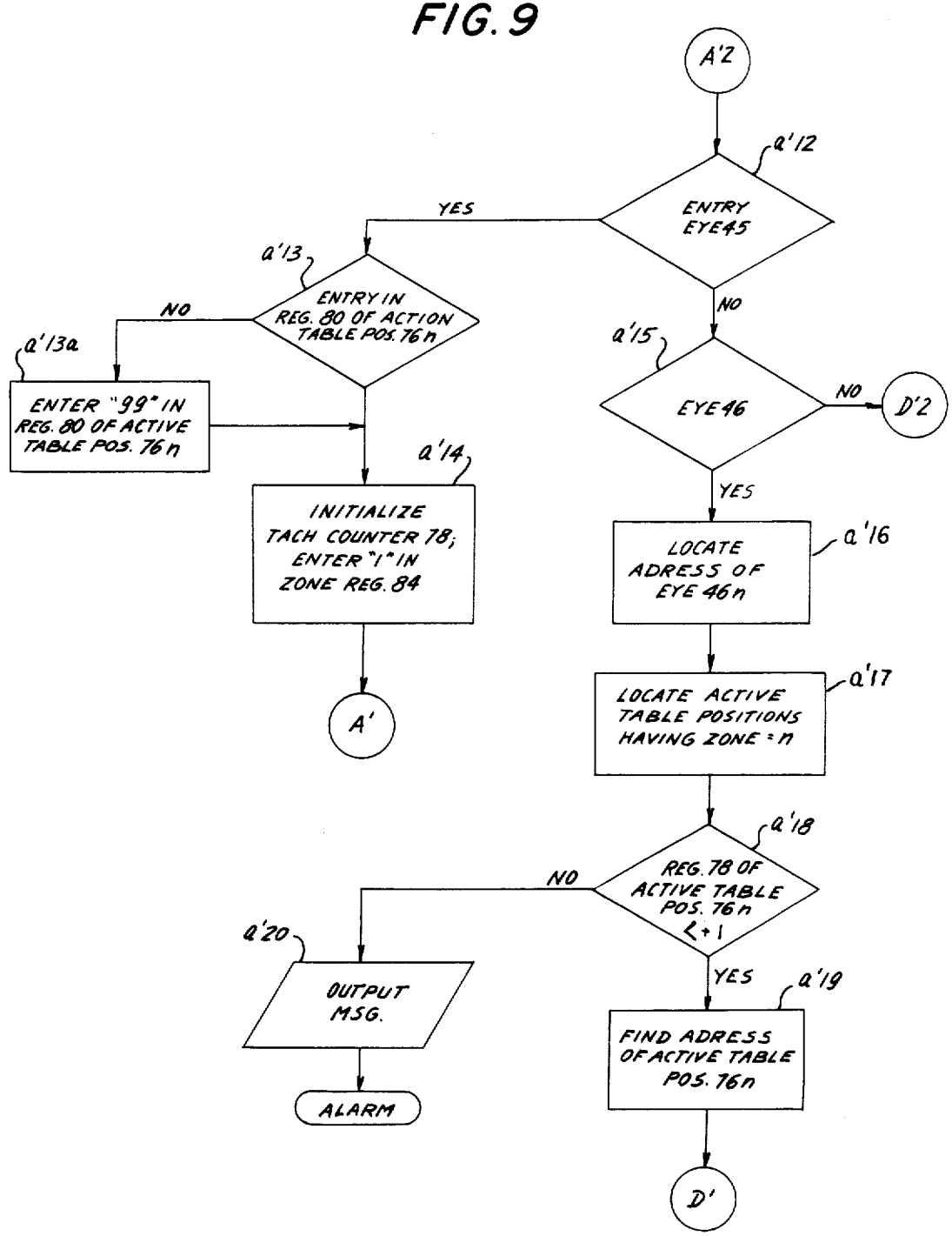
Figure 10:
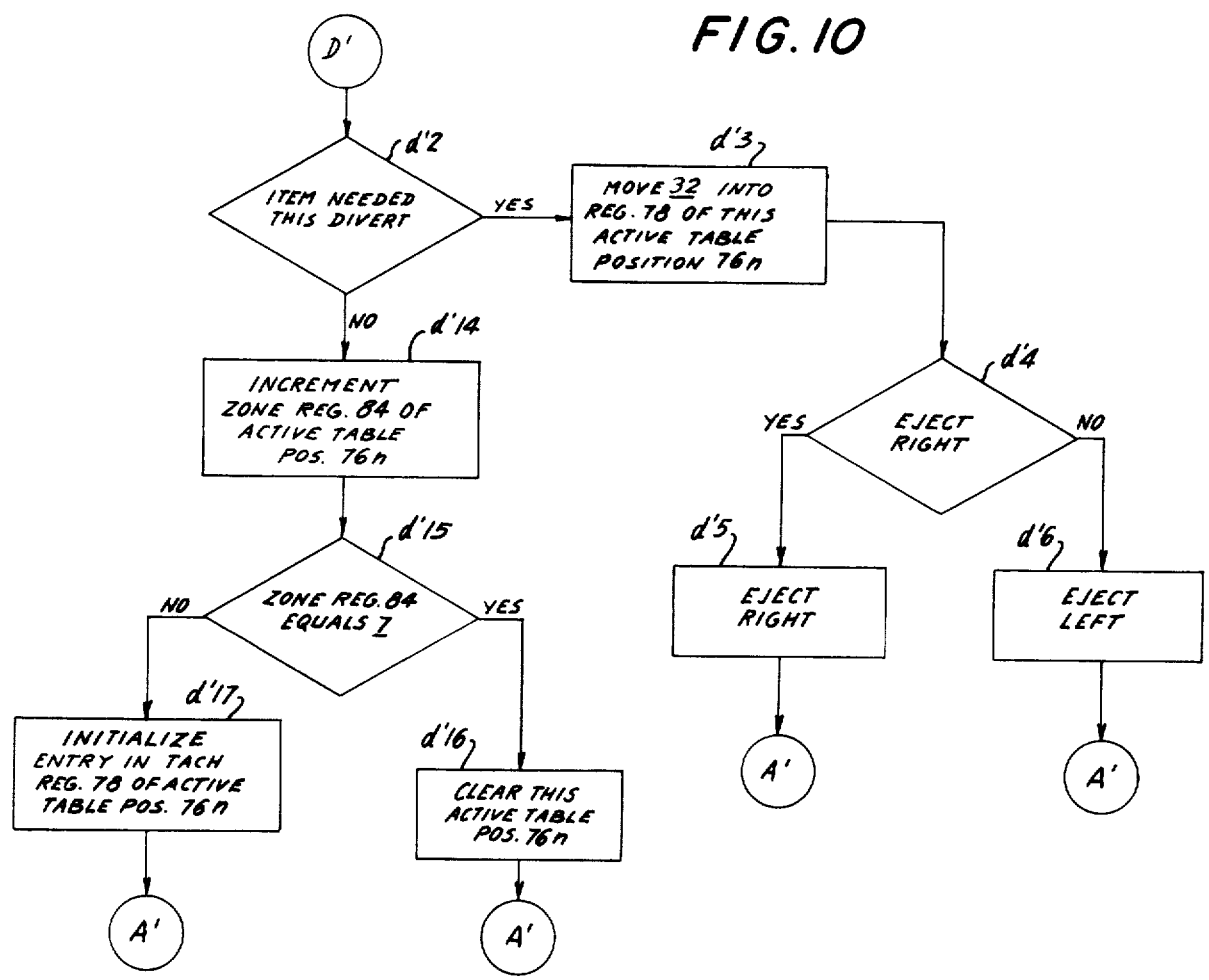

The interrupt at block a'3 may be an "eye" interrupt from any of the six eyes 46 that detect a package traveling along the conveyor system. That interrupt drops to block a'5 and via connection A'2 to block a'16 (FIG. 9). This block represents a chain of decision blocks that determine the address of the particular eye 46 that is responsible for the interrupt among the six diverter eyes 46-1, 46-2, etc.

As a typical case, let it be assumed that eye 46-1 is responsible for the interrupt. If so, when the address of eye 46-1 is located, up to three active table positions 76 are coordinately identified (block a'17) having "1" in their registers 84. (No more than three packages may be loaded onto belt conveyor 40-1 in this example.) Those zone-1 active table positions are tested (block a'18) to determine the number then entered in their tach counters 78.

It was mentioned above that each initialized tach register 78 is decremented in response to each tach pulse from generator 52. This occurs in an independent, priority, free-running program shown in FIG. 17. Its cycle is initiated by tach-pulse interrupts from generator 52 at connection X—X. These interrupts to block x-1 decrement the tach registers 78 in each of the active table position 76 that contain entries. The interrupt drops to decision block x-2 to test each decremented register as to whether $-39$ has been reached, then to block x'3. The decrementing of successive tach registers 78 and tests for $-39$ continue until all entry-containing positions in active table 76 have been processed, the routine that was initiated by any one tach pulse coming to STOP. However, if any $-39$ entry should appear, the interrupt shifts to "Output Message" block x'4 and the entire system goes into ALARM.

Count-down to $-39$ shows that the maximum allowed number of tach pulses was exceeded. It may be due to several causes. A package may be delayed excessively because of an odd characteristic that causes more than the allowed "slip". An excessive time interval may also elapse after a package leaves one eye and before the next eye is broken if a package falls off the conveyor or if the package path is obstructed or if a belt conveyor is arrested or becomes abnormally slow. Where photoelectric eyes are the form of detector used, a condition arises which simulates excess travel time, where two packages are spaced apart upon leaving one eye and where they shift against each other before reaching the next eye. In that condition, the second eye 46 does not normally recognize the arrival of the second package.

(As an alternative to the routine of testing each register 78 each time it is decremented, it would be feasible to delay the tests for $-39$ until a package is detected by the next-following eye 46. However, this alternative would not respond to some of the abnormal package-transporting conditions mentioned above.)

Assuming no excess travel-time condition exists, the routine of FIG. 17 stops, awaiting the next tach pulse.

The routines executed in response to interrupts at connection A' are executed in the intervals between the cyclic priority routine of FIG. 17.

So long as there is no ALARM, it follows that there are no positions in the active table 76 having counts less than $-38$ in their registers 78.

The interrupt initiated by eye 46-1 drops to decision block a'18 to determine whether any zone-1 tach register 78 contains less than $+1$, i.e., $0$ to $-38$. There can only be one zone-1 active table position 76n that yields a "yes" result. The interrupt drops to block a'19 to find the address of that zone-1 active table position 76n and to decision block d'2 (FIG. 10) via connection D'.

Block d'2 compares the code of eye 46-1 with the corresponding portion of the code in register 80 of that active table position 76n, i.e. the position containing both a "1" zone entry and a tach entry of $0$ to $-38$. The package responsible for this eye 46-1 interrupt may be needed at order assembly lane 44-1 or 44-2, or it may not be needed at either lane.

If a package is needed, its divert travel-time may be monitored by a suitable timer. A distinctive form of timer is provided here. For this purpose, the interrupt to block d'3 causes $+32$ (for example) to be moved into register 78 in active table position 76n related to this package. This entry into register 78 starts a new timing interval, stripped of variables occurring along the forward-travel path A, for diverter 42-1 to transport a package to acknowledgement eye 50-1 or 50-2. In an example, a 70-pulse interval was found appropriate. This interval includes an allowance for the minimum travel time and for maximum travel time along a divert path B, for "slip" due to various causes, etc. If a package is unduly delayed, the identity of the package could be in doubt. Starting with $+32$, register 78 related to an excessively delayed package is decremented by tach pulses beyond the allowed 70 pulses to $-39$, and (FIG. 17) the system goes into ALARM.

Normally the interrupt drops from block d'3 to block d'4 for a "right" or "left" divert selection in dependence on the lane code in register 80 of the related table position 76n. The interrupt drops to block d'5 or d'6 for activating the diverter in the selected direction, the program returning to connection A'. The package presumably is diverted to lane or site 44-1 or 44-2.

Figure 11:
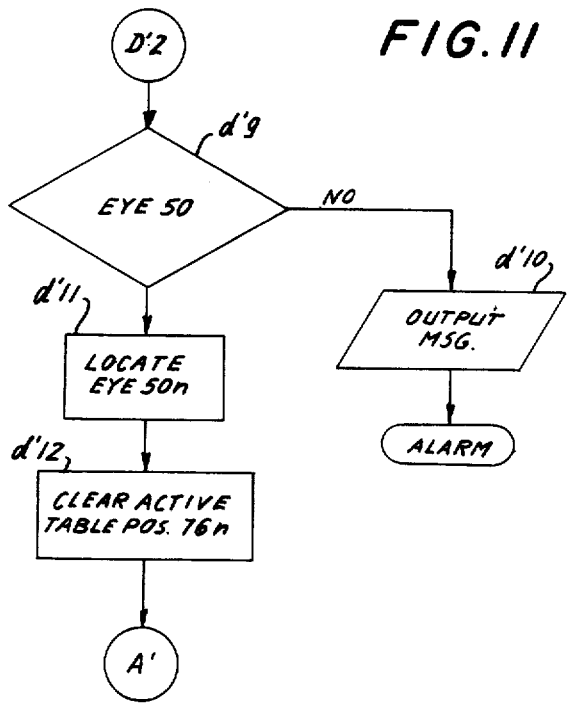
Figure 12:
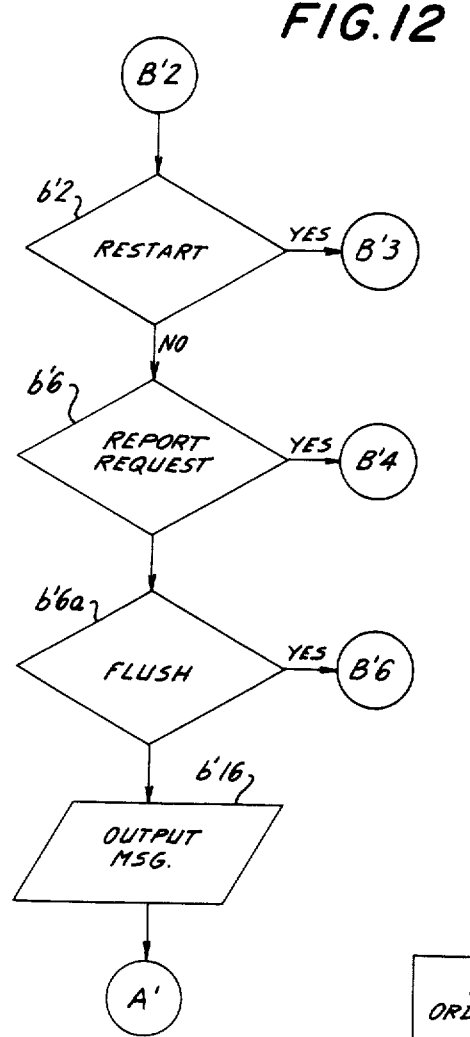
Figure 13:
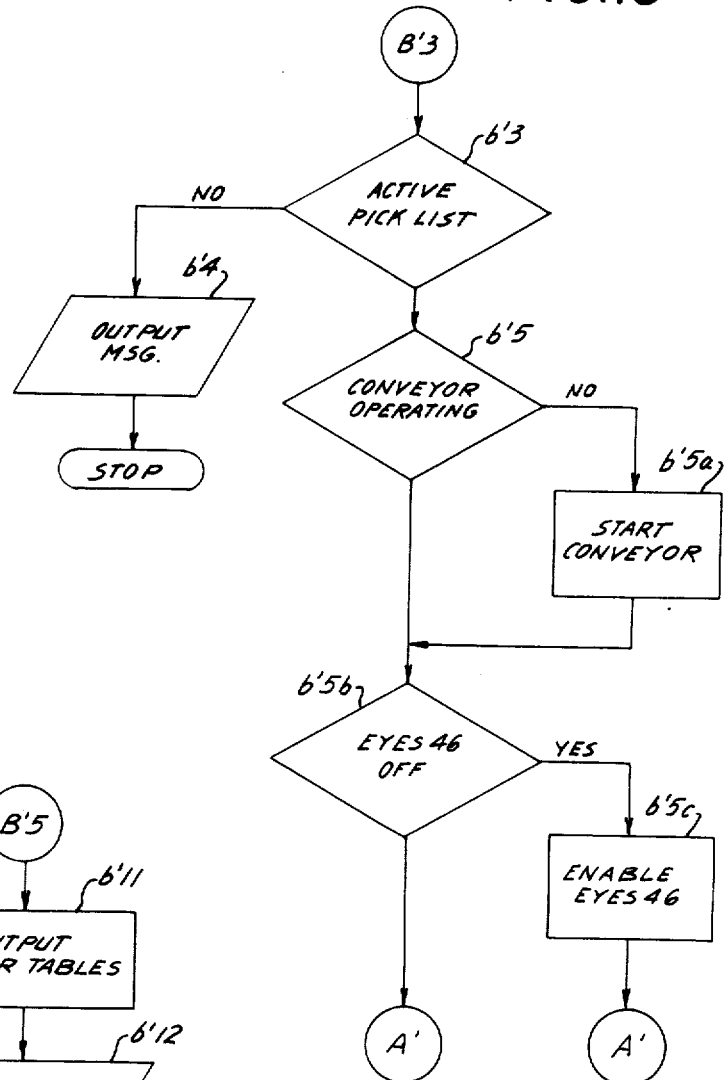
Figure 14:
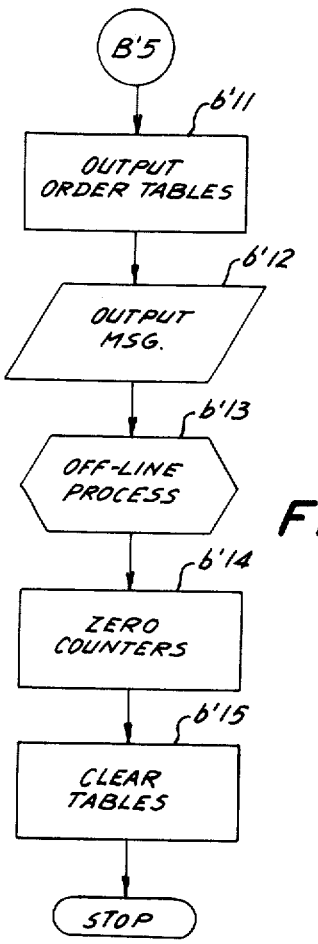
Figure 15:
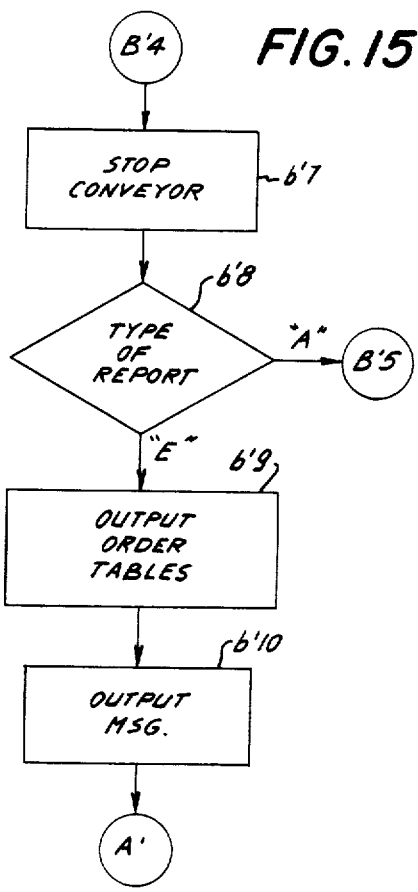
Figure 16:
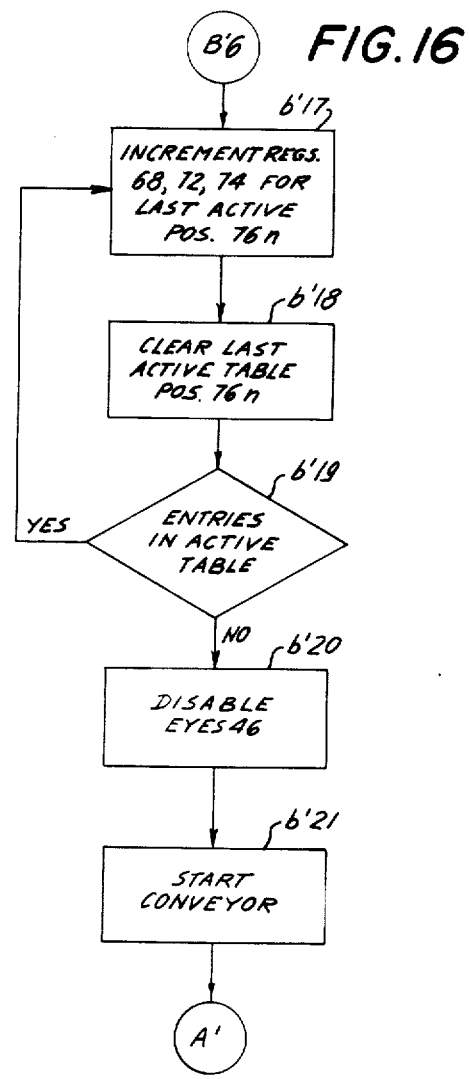

Returning to FIGS. 8 and 9, if an interrupt is an eye interrupt and if it is neither an eye 45- nor an eye 46-interrupt (the codes of eyes 46 and 50 having distinguishing bits), the interrupt from decision block a'15 drops to decision block d'9 via connection D'2 (FIG. 11). A spurious interrupt drops to block d'10 and to ALARM. An eye 50 interrupt drops to block d'11 to locate the address of eye 50-1 or 50-2 (in this example) by comparing its code with the entire code in lane register 80 of the active table position 76n related to the package being tracked. That the program continues in operation signifies on-time delivery of the package to acknowledgement eye 50; otherwise the tach register 78 in its divert-timer role would have been decremented to $-39$ stopping the belt conveyors, the diverters and the tach generator. Accordingly, the package responsible for breaking the related eye 50 has been verified as having been delivered timely to its assigned order assembly site 44. The interrupt drops to block d'12 to reset the active table position 76n related to this package, the data being no longer needed.

In case the delivery of a package is not acknowledged by the related eye 50, the ALARM condition resulting from a tach register 78 dropping to −39 would not result in resetting of the active table position related to any package which did not reach its eye 50, whether it was unsuccessfully diverted or it was prevented (as by package back-up) from reaching an eye 50. For all such undelivered packages, entries in the related active table positions are available. Notably the item number in each register 82 and the lane number in each register 80 are to be used subsequently (FIG. 16, discussed below) to increment counter 72 of the related order table 60 and to increment the temporary counter 68 for that item in that order. This operation corrects for the deductions that were made from those order registers when the package was first scanned.

The item numbers in the active table positions are not part of the package tracking system. In the described apparatus, tracking of a package depends on its timing, from its entry at eye 45 to its timely arrival at each eye 46 and at eye 50 of its designated delivery lanes 44.

As part of the resetting of an active table position 76n, its tach register 78 is reset. Thus, each tach register 78 serves as part of a timer started by an eye 46 and prevented from timing-out by a related tye 50 and resetting of register 78. This is a role of tach register 78 additional to its function in monitoring package speed along segments of the conveyor system. The timing interval ends with reset of this register 78. Due to ordinary program techniques, after any entire position in the active table has been reset, its tach register 78 is not responsive to the tach-pulse decrementing routine of FIG. 17.

The apparatus as thus far described provides a "window" allowing for a range of "slip" of packages on a belt conveyor or on a segment of the system comprising the forward-feeding rollers of a diverter plus the next-following belt conveyor, and the apparatus provides separately for diverter travel time including provision for a latitude of variation in the time needed for packages reaching an eye 46 to travel to a related eye 50.

Where a small computer is to be used and its capacity is limited, various changes may prove advantageous. Thus, omitting the separate diverter timing feature may be an acceptable modification. The timing examples above may be used in one such modification, i.e. 108 tach pulses as the minimum non-slip travel time of a package from entry eye 45 to diverter eye 46-1, plus an allowance of thirty eight tach pulses for "slip", and a range of additional tach pulses as the maximum needed for a diverter to transport a package from the diverter eye 46 to a related eye 50. Using the conveyors and diverters as in FIG. 7, the modified system can be made to work dependably, without providing separately for timing of package travel in the diverters, simply by allocating more space along the conveyor to each package, or by reducing allowances for slip and diverter time as may be justified by experience.

Referring again to the form of apparatus shown in FIGS. 7–17, it is conceivable that a package may arrive at an eye 46, e.g. eye 46-1 at the end of zone "1", yet there is no active table position whose tach register 78 reads less than "1". This signifies premature arrival of a package at a diverter eye, and its tracking is in doubt. The interrupt at block a'18 (FIG. 19) drops to block a'20 to produce an output message, and to ALARM.

It may be determined that a package that activated diverter eye 46-1 was in fact a timely package (block a'18) and its active table position 76n shows at register 84 that it is a package on conveyor 40-1 (zone 1), but a check of its register 80 (block d'2, FIG. 10) shows that it is not needed at either order assembly lane 44-1 or 44-2. The interrupt drops to block d'14 causing zone register 84 in this active table position 76n to be incremented to "2". Since zone register 84 does no equal "7", the interrupt to decision block d'15 drops to block d'17, causing tach register 78 to be initialized, i.e. set at 186. In this example, there are 186 tach pulses during non-slip travel of a package through each of the next conveyor segments, from each divert eye 46 to the next divert eye. Then the program returns to connection A'.

This package is transported by the active rollers of diverter 42-1 to belt conveyor 40-2 and to divert eye 46-2. Exactly the same programming applies to the package on the second conveyor 40-2 and travel eye 46-2 as was described above for a package on conveyor 40-1. If the package is not needed for lane 44-3 or 44-4, the package is transported to conveyor 40-3 by the active rollers of diverter 42-2; and the same program is executed for this package for the succesive conveyors and diverters so long as it is not needed. Each time a package is not needed at any diverter 42, and so long as the entry in zone register 84 of the active table position 76n identified with this package is less than "7", zone register 84 for the active table position 76n representing this package is repeatedly incremented (block d'14) and tach register 78 in the related active table position is repeatedly initialized at 186 (block d'17). Zone register 84 in this active table position 76n ultimately reads "7". The interrupt then reaches block d'16 to clear this table position 76n. The package leaves conveyor reject end R.

The above description deals with the first and each succeeding package that is scanned, then passes entry eye 45, and is transported along conveyor 40-1, and along following conveyor segments 42-1/40-2, 42-2/40-3, etc. During the routine operation of the apparatus, there are many packages distributed along the conveyor system. Interrupts arise at many positions of the system—for example from eye 45, from six eyes 46, and from twelve eyes 50. These interrupts and the related logic and computing operations occur at very high speed but are well within the capacity of a computer of modest cost. Processing of one interrupt may be completed before the next occurs, but if interrupts should occur more frequently, they are in effect lined up and utilized in sequence using customary computer techniques executed by block a'3.

The foregoing system goes into ALARM if a diverted package "hangs up" and fails to reach its eye 50 on time. A control might be provided to draw attention to a back-up of packages at each eject lane and separate detectors could be provided for that purpose. However, the foregoing system automatically covers the contingency of any back-up packages in an eject lane. Such a package is diverted (after starting a timer related to that diverter) but it is blocked due to the assumed back-up of packages in that lane. It does not produce a timely light-to-dark change of the related eye 50, and the system goes into ALARM. Consequently, any pile-up of packages in an eject lane has the same effect as a package that hangs up at a diverter. The conveyor system stops (see below) both for hang-up of a package and for back-up packages in an eject lane. The attendant locates the difficulty. All packages that failed to reach respective eyes 50 are placed back on the conveyor system. The related active table positions are not cleared. All packages in the backed-up lane that reached or passed their respective eyes 50 are pushed manually onto the order assembly tables.

Under a variety of conditions, diverting of packages to order assembly lanes 44 is aborted in a "flush" mode of conveyor operations, and the packages on the conveyor are delivered to the reject end R of the conveyor. All of the packages loaded onto the conveyor are presumably needed for completing the merchandise that is to be assembled at the various lanes 44 to fill the several orders. Therefore, the packages thus discharged at the end R of the conveyor system are brought back to the loading end L of the conveyor system, for renewed program-controlled distribution. This includes any diverted package that failed to reach its acknowledgement eye 50 due to hang-up or back-up of packages in a divert lane 44. As noted above, only the active table positions corresponding to successfully diverted packages are cleared (block d'12, FIG. 11). Packages remaining on the conveyor system are represented by entries in active table positions 76 that have not yet been cleared. Some of the active table positions are routinely cleared (see above, block d'16, in FIG. 10.)

The ALARM interrupts of FIGS. 8, 9, 11, 17 and 18 stop the conveyor system. If the attendant can readily correct the cause for the ALARM, the manual "Restart Conveyor" interrupt is used to resume distribution of packages on the conveyor. If there is any doubt as to reliability of the distribution, the "Flush" manual interrupt is used. This interrupt drops via connection B'2 (FIGS. 8 and 12) via connection B'6 (FIG. 16) to block b'17 to correct for items initially deducted from the order tables but not actually delivered to the corresponding order assembly lanes. Counters 68, 72 and 74 are incremented under control of registers 80 and 82 in the successive positions of the order tables. After each active table position 76n has served in the correction process, it is rest (block b'18) and the interrupt drops to block b'19 to test for any other active table positions containing entries. The sequence of blocks b'17, b'18 and b'19 is repeated until the last active table position has been used in the correction process and has then been cleared. The interrupt to decision block b'19 drops to block b'20 to disable eyes 46 (a precaution ) and to block b'21 to restart the conveyor, returning to connection A'.

The restarted conveyor discharges the packages from the conveyor at reject end R. (Block b'21 may be omitted from the flow chart and replaced by an external manual control operated by the attendant to unload the conveyor.) After the conveyor has been unloaded completely, distribution of packages can be resumed with a "Restart" interrupt (described below). The packages at reject end R presumably were needed for filling the orders, and may be loaded on the conveyor again.

At some point, after evey item in every order table has been supplied, counter 74 will read zero. If counter 74 does not read zero, the attendant may request a report showing missing items. (In preparation for such a report request, normally the system will be allowed to operate until the packages on the conveyor have been distributed.) For a report request a manual interrupt may be introduced for obtaining a status report listing the shortages, either by printing the amounts registered in all the temporary and permanent counters or by printing and/or displaying the differences between those counters, item-by-item, for all the orders as a shortage "pick list" and/or, order-by-order. Then the attendant may obtain some or all of the missing items and resume distribution of the packages. A later status report may show that the only shortages are in items that are out of inventory and cannot be supplied. The attendant then can operate controls that introduce a manual interrupt calling for shipping papers to be printed, based on order tables 60 and collateral information stored with those tables.

During production of any such report and at other times, the conveyor system is stopped. The conveyor system is started both initially and to resume the order-assembly operations by operating a manual control to produce a "restart" interrupt.

Like the "eye" and "scan" interrupts, "manual" interrupts enter the "wait" block a'2 (FIG. 8) and drop down to block b'2 (FIG. 12) via connection B'2. If the manual interrupt is for restarting the conveyor system, it drops to decision block b'3 (FIG. 13) via connection B'3. Here determination is made as to whether the order tables 60 contain data. If not, the interrupt to block b'4 causes production of an appropriate output message, and the program ends. If orders are listed for distribution, the "Restart" manual interrupt drops to decision block b'5. If the conveyor was at rest, the interrupt to block b'5a starts the conveyor. The interrupt from block b'5 (directly, or indirectly via block b'5a) drops to decision block b'5b for testing whether eyes 46 were disabled. If so, eyes 46 are enabled (block b'5c). In any case, the program returns to connection A'. The entire equipment is then in condition to receive packages, resuming the distribution process.

When a status report is wanted, ordinarily the attendant will stop loading packages on the conveyor and wait until the packages on the sorting conveyor have been distributed. A manual status report interrupt to the computer drops from block a'3 (FIG. 8) via connection B'2 to decision block b'6 (FIG. 12) and to block b'7 (FIG. 15) to stop the conveyor system. Decrementing of the tach registers 78 in the active tables is also suspended, because the tach pulse generator is operated by one of the belt conveyors. The interrupt drops to block b'8 where a decision is made as to whether an "E" report (status) or an "A" report (e.g. shipping papers) is wanted. If a status report is wanted, the interrupt drops to block b'9 to cause output printing of the order tables showing both the tempoary and permanent registers. Additionally, the computer is programmed to print a consolidated list of the items in all of the orders not yet filled and the shortages as shown by the total of all registers 68 for each item separately. This constitutes a "pick list" of items to be obtained if available and loaded onto the sorting conveyor to fill the orders. The interrupt drops to block b'10 for outputting a message identifying the type of report, and the program returns to A' (FIG. 8).

Where a final "A" report is wanted, the manual interrupt drops through decision block b'8 and connection B'5 (FIG. 14) to block b'11 to print out data derived from tables 60, e.g. as a set of shipping papers, etc. The order tables accurately reflect the merchandise assembled at the various lanes 44-1 through 44-12 (this example). Shortages can be noted in the report, whether in the form of shipping papers or otherwise. The interrupt drops to block b'12 to print a message (if desired) indicating the kind of report; to block b'13 to transfer the data to off-line data processing equipment; to block b'14 to zero all counters; and to block b'15 to clear all order tables and active tables. The process of assembling the merchandise for that group of orders is complete, and the program can then STOP, or it can be extended to institute start-up steps for entering and then processing the next group of orders.

Returning to FIG. 12, if there were a manual interrupt other than a "restart", a report request or a "flush", the interrupt would drop down to block b'16, resulting in the printing of an "error" output message, and the program would return to connection A'.

As has already been noted, diverter electric eyes 46 have two functions: serving as part of a travel-speed monitoring means and in their role as selective diverter control means. Those detectors in the foregoing system are part of a travel-speed verifying means that enables a non-positive conveyor system to be used in a high-integrity order-assembling system. Instead of the dual-purpose detectors 46 of the apparatus in FIGS. 7-17 two separate series of detectors may be used for the separate functions of "window" or "slip" monitoring and for controlling the selective delivery of the packages. The term "window" refers to the permissible deviation between no-slip travel of a package and maximum permissible "slip" (0 to $-38$ or, referred to mean speed, $\pm 18$.) Where a separate series of detectors are used as part of a "window" detector system, they may be distributed appropriately along the conveyor system without concern for location of the diverter-control detectors.

It has also been noted that the apparatus of FIG. 7 can utilize a positive-advance type of conveyor system, or one that so nearly approximates a positive-advance system as to be its equivalent. Positive-advance conveyors are typified by the tilt-tray type in FIG. 1, but others are well known. Other forms of positive-advance conveyors are those that have "flights" or bars spaced apart along the conveyor path, carrying the packages in step with the conveyor drive. In a system like that of FIGS. 7-17, modified to utilize a positive-advance conveyor with a single scanner, the "slip" testing system represented by blocks a'18 and x'2 (FIGS. 8 and 17) may be superfluous. Registers 78, decremented by tach pulses, may be retained for tracking the packages.

In a contemplated modification of the system, some of the packages loaded onto the conveyor may have multiple units of certain items. The package code would then include both the item number and the quantity of units in that package. That package would accordingly be designated for delivery to an order assembly lane whose temporary counter 68 equals or exceeds that number of units. The number in a temporary counter 68 would be reduced by the plural number of units, and the quantity of units would be an additional entry in the active table position 76 representing that package. Subsequently, in case the conveyor is operated in its "flush" mode, the respective temporary registers 68 would be increased, not by "1" as in the above system, but by the actual number of units in the various packages represented by the additional entry in the active table.

A further exemplification of apparatus for processing a group of orders concurrently may assume the form of a common package-supplying location, a single device for entering package identifications into the computer, and selective conveyor segments that fan out to the several order assembly sites. However, the common-path conveyor systems with multiple diverters in FIG. 7 is characteristically low in cost and highly flexible, being adaptable for virtually all kinds of packages.

In a contemplated modification, the attendant of the apparatus in FIG. 7 could replace scanner 48, by manually entering the package-identifying code of each item. Such modified apparatus would retain the remainder of the system shown in FIGS. 7-17 and described above. However, visual product identification and entry are prone to error that would impair the high integrity of the automatic order-assembling system of FIGS. 7-17.

A further embodiment of the invention so resembles that of FIGS. 7-17 that it may be described in connection with those figures. The apparatus includes the single scanner and all of the conveyor structure of FIG. 7, and the computer is organized to include order tables, an active table and the other computer constituents in the above-described embodiment.

In this embodiment, the item number of a package at the loading end of the conveyor is entered at register 82 in its active table position 76n, omitting lane registers 80 and the related program steps. The initialized tach count is entered into the active table position 76n, and the tach counts of all the active table positions are decremented as in the previous embodiment. When a package breaks a diverter electric eye 46, the active table position corresponding to the package-breaking eye is located as before. The item number in that active table position is compared with the unfilled order or pair of orders (successively) related to the activated eye 46 and its diverter. (This is essentially the same as in FIGS. 1-6, except that the items in the order related to a diverter in this embodiment are tested against an item entry in the active table rather than against the registered output of a scanner at the diverter as in FIGS. 1-6), and the packages are tracked as in FIGS. 7-17.

In this embodiment, the temporary counter 68 of an order is decremented when the diverter is activated to direct a package to the related order assembly site. Successful-divert eyes 50 can be used in this modification in much the same way as in FIGS. 7-17. In case a package that should be ejected does not break eye 50 when it should, the system may go into ALARM; and the reduced count in counter 68 can then be increased to correct for the failure of the apparatus to eject the package successfully. With few exceptions, the program of this modification remains the same as in FIGS. 7-17. Status reports and final reports are obtained as before, etc.

In the apparatus of FIGS. 7-17, the requirements in the first order 60-1 for any item are filled before units of that item are designated for any other order of the group. This may meet a commercial objective. If there is any item in short supply, there may be a valid reason to assign priority to certain orders by ranking them early in the group. The priority orders will be filled first, so long as a limited supply of an item lasts, before the lower-priority orders obtain any units of that item. The apparatus is not limited to that mode of operation. Instead, the program can be set up to distribute successive units of a given item to successive orders of the concurrently processed group of orders. This is illustrated generally in FIG. 18.

The items needed to fill all the orders of a group may be arranged in a "pick list", column 66' in FIG. 18. The computer is organized internally to conform, in operation, to this table. The quantities of any item in the first order #430 related to order assembly lane 1 (col. 62'-1) are entered in temporary counter 68'-1 and permanent counter 70'-1. If the first item in the pick list is also needed in order #431, to be delivered to assembly lane 2 (col. 62'-2), the quantity is entered in the temporary counter of Col. 68'-2, etc. The total requirements for that item in all the orders is entered in a register for that purpose (reg. 72' in FIG. 19). If all twelve orders of the group require a particular item, the quantities are entered into counters 68'-1 . . . 68'-12 and 70'-1 . . . 70'-12. A "lane index" counter or register 86 is provided for each item in the table.

FIG. 19 represents a modification of the flow chart of FIG. 8 to implement the plan of distribution of successive units of an item to successive orders requiring that item. All other flow charts of FIGS. 9–17 remain unchanged, and the flow chart of FIG. 8 remains unchanged up to block a'7b and after block a'10.

An interrupt from block a'7 drops to block a'8a (FIG. 19) to locate the address of the item as represented in the table of FIG. 18. The interrupt drops to block a'8b to test the total item quantity register 72'. If it is "0", the interrupt to block a'8c sets the "reject" lane number such as "99" in the related active table position 76'n (like block a'9, FIG. 8), the program then returning to connection A'. If the item register is not "0", then the interrupt to block a'8d causes "1" to be added to the corresponding lane index counter 86. The interrupt to decision block a'8e next tests whether that lane index counter equals "13", that is, one more than the group of twelve orders being processed in this example. If "yes", then the interrupt to block a'8f causes "1" to be moved into the lane index counter 86. In any case, the interrupt to block a'8g causes the temporary quantity counter 68' of lane 62'-n (FIG. 18) to be tested. If counter 68' of that lane 62'-n is zero, again "1" is added to the lane index counter 86 of this item; and this sequence is repeated until the first lane/order 62'-n needing this item is located. Order is thus selected to receive the item and, correspondingly, the item is allocated to the seleced order. The program reverts to that of FIG. 8 at this point, block a'10. The lane number may be entered into the lane register 80 of the next available active table position 76'n and "1" is deducted from the related order temporary counter 68', item total counter 72', and from the grand total counter if used. The program then returns to connection A'.

The tracking system described above in connection with FIGS. 7–17 is represented in FIG. 20A. A package is tracked in the active table by zone number and tach number. For conveyor segment 40-1, the package carried by the conveyor is identified in an active table position 76n as 1:108, 1:107 . . . 1:0 . . . 1:−37, 1:−38 and 1:−39 (ALARM) in the course of conveyor travel, while tach pulses are being produced by tach pulse generator 52. For the conveyor segment of diverter 42-1 in its non-divert mode plus belt conveyor 40-2, the package is tracked by the numerals 2:186, 2:185 . . . 2:0 . . . etc. That numerical scheme can, of course be varied endlessly. Thus, instead of counting from 108 down 0 and to −39 (ALARM) for a package traveling along short conveyor 40-1, and from 186 down to 0 and −39 (ALARM) for a package traveling along the following segments 42-1/40-2; 42-2/40-3, etc., FIG. 20B shows an equivalent scheme in which the tach counts increase after being initialized appropriately. In this form, minimum travel time occurs when any tach register 78' attains 186 for all the conveyor segments and the ALARM condition occurs at a count of 225. Each tach register 78 is initialized by an entry of "78" for zone "1" (a short zone) to attain the same test numbers "186" and "225" as for the following longer zones. Moreover, the zone number and the tach counts can be merged into a composite number as indicated in FIG. 20C. Of course, the computer is to be programmed accordingly to recognize specific numbers in the continuous sequence as signifying "minimum travel time" and "ALARM" for each monitored travel segment. These examples provide a "window" to accommodate varying "slip" within an allowable range and to signal ALARM when excessive "slip" may signify doubtful tracking of a package. Each tracking regime includes the feature of initializing the tach register as any package enters upon each new segment of the conveyor system to avoid pyramiding of deviations within the permissible range of slip occurring along each of the preceding conveyor segments. In this way, the tracking of any package versus the conveyor travel starts anew each time that package enters a new segment of the conveyor system. The process of repeatedly initializing the tach counts avoids pyramiding of the changeable degrees of slip occurring in the successive conveyor segments.

The foregoing description of several illustrative embodiments of the invention in its various aspects is of course subject to numerous variations and further modification by those skilled in the art. Therefore, the invention should be construed broadly in accordance with its full spirit and scope.

What is claimed is:

1. Apparatus for concurrently processing a group of orders, wherein each order specifies items of one or more varieties and specifies a quantity of items of each variety, by selectively distributing items in the orders to separate order-assembly locations related to the orders of the group, items of the same variety having a common characterization without regard to whether they appear in one or more of the orders and items of different varieties having different characterizations, said apparatus including i. conveyor means for carrying a series of items to be distributed to the separate order-assembly locations, said conveyor means including plural selective delivery means for directing items carried by the conveyor means selectively to the separate order-assembly locations;

ii. item registering means for registering the characterizations of the items carried by the conveyor means;

iii. order registering means comprising (a) order identifying means for storing identifications of the orders of the group to be processed concurrently, and (b) means for storing characterizations of the varieties of items required in the respective orders, the stored identifications of the orders and the stored characterizations of the items in the orders being related to each other, and (c) means for storing the quantity of each variety of item required in each order;

iv. order selecting means jointly responsive to both said item registering means and said order registering means (a) for selecting respective orders, if any, in said order registering means that require the items carried by the conveyor means, said order selecting means including means for comparing each registered item characterization with a succession of stored item characterizations, thereby allocating such items to the selected orders, respectively;

v. means responsive to said order selection means for controlling said plural selective delivery means to direct each allocated item to a selected one of said order-assembly locations that is related to the selected order; and vi. means for continuously accounting for the allocation of items to said selected orders, said accounting means controlling said selecting means for preventing selection of any order and allocation of any item to any order exceeding the quantity of that item in the quantity storing means for that item related to that order.

2. Apparatus as in claim 1 wherein said conveyor means includes a succession of portions extending to respective ones of said plural selective delivery means, wherein said item-characterization registering means comprises a scanner disposed along the conveyor means in advance of all of said plurality selective delivery means, said apparatus further including means for verifying the delivery of each allocated item to the selected one of said separate order-assembly locations, and means responsive to the verifying means in case of failure of an item to be delivered to said selected one of said separate order-assembly locations for disabling all of said plural selective delivery means from delivering items to said separate order-assembly locations and for maintaining said succession of plural conveyor portions in operation while said plural selective delivery means remain disabled, thereby causing all the items on said succession of plural conveyor portions to be delivered non-selectively to a common location.

3. Apparatus as in claim 1 wherein said conveyor means includes a succession of portions extending to respective ones of said plural selective delivery means, wherein said item-characterization registering means comprises a scanner disposed along the conveyor means in advance of all of said plural selective delivery means, said apparatus further including means for verifying the delivery of each allocated item to the selected one of said separate order-assembly locations approximately at a time when such delivery should occur in the course of routine operation of the conveyor means, and means responsive to the verifying means in case of failure of an item to be delivered to said selected one of said separate order-assembly locations approximately at said time for disabling all of said plural selective delivery means for delivering items to said separate order-assembly locations and for maintaining said succession of plural conveyor portions in operation while said plural selective delivery means remain disabled, thereby causing the items on said succession of plural conveyor portions to be delivered non-selectively to a common location.

4. Apparatus as in claim 1 wherein said conveyor means includes a succession of plural portions extending to respective ones of said plural selective delivery means, wherein said item-characterization registering means comprises a scanner in advance of all of said plural selective delivery means, said apparatus further including means for verifying the delivery of each allocated item to the selected one of said separate order-assembly locations, means responsive to the verifying means in case of failure of an item to be delivered to said selected one of said separate order-assembly locations for disabling all of said plural selective delivery means from delivering items to said separate order-assembly locations and for maintaining said succession of plural portions of the conveyor means in operation while said plural selective delivery means remains disabled, thereby causing the items on the succession of plural portions of the conveyor to be delivered non-selectively to a common location, further including means responsive to said verifying means for correcting the aforesaid accounting means corresponding to the items on the successive of plural portions of the conveyor means while operation of the plural selective delivery means is disabled.

5. Apparatus as in claim 1 wherein said conveyor means includes a succession of plural portions extending to respective ones of said plural selective delivery means, wherein said item-characterization registering means comprises a scanner in advance of all of said plural selective delivery means, said apparatus further including means for verifying the delivery of each allocated item to the selected one of said separate order-assembly locations approximately at a time when such delivery should occur in the course of routine operation of the conveyor means, means responsive to the verifying means in case of failure of an item to be delivered to said selected one of said separate order-assembly locations approximately at said time for disabling all of said plural selective delivery means from delivering items to said separate order-assembly locations and for maintaining said succession of plural portions of the conveyor means in operation while said plural selective delivery means remains disabled, thereby causing items on the succession of plural portions of the conveyor to be delivered non-selectively to a common location, further including means responsive to said verifying means for correcting the aforesaid accounting means corresponding to the items on the succession of plural portions of the conveyor means while operation of the plural selective delivery means is disabled.

6. Apparatus as in claim 1, wherein said item characterization registering means comprises a scanner disposed along said conveyor means in advance of all of said plural selective delivery means, and wherein said accounting means accounts for the items allocated to a selected order when the allocation is made, said apparatus further including means for verifying delivery of each allocated item to the order-assembly location related to the selected order and means controlled by said verifying means for correcting the accounting means in case an item allocated to a selected order is not delivered to said selected one of said order-assembly locations.

7. Apparatus as in claim 1, wherein said item characterization registering means comprises a scanner disposed along said conveyor means in advance of all of said plural selective delivery means, and wherein said accounting means accounts for the items allocated to the respective orders when the allocations are made, said apparatus further including means for verifying discharge of each item to one of said separate order-assembly locations related to the selected order approximately at a time when such discharge should occur in the course of routine operation of the conveyor means, and means controlled by said verifying means for correcting the accounting means in case an item allocated to an identified order is not discharged to said selected one of said separate order-assembly locations approximately at said time.

8. Apparatus for concurrently processing a group of orders, each order typically requiring items of plural varieties, by assembling items required in the orders at separate order-assembly locations related to the orders of the group, items of the same variety having a common characterization without regard to whether they appear in one or more of the orders and items of different varieties having different characterizations, said apparatus including i. conveyor means for carrying a series of items to be assembled at the separate order-assembly locations, said conveyor means including plural selective delivery means for directing such items selectively to the separate order-assembly locations;

ii. item registering means for registering the characterizations of the items carried by the conveyor means;

iii. order registering means comprising means for storing identifications of the orders of the group of orders to be processed concurrently and means for storing the requirements for the items of each variety in each order, the stored order identifications and the stored item requirements being related to each other in accordance with the orders;

iv. order selecting means jointly responsive to both said item registering means and one of the item requirements storing means in said order registering means for selecting an order, if any, in said order registering means that requires each item carried by the conveyor means; and v. means responsive to said order selecting means for controlling said plural selective delivery means to direct items carried by the conveyor means selectively to separate order-assembly locations related to the selected orders.

9. Apparatus for concurrently processing a group of orders as in claim 8, wherein said plural selective delivery means are distributed along a path and wherein said conveyor means includes a series of conveyor portions distributed along said path, there being a series of control positions along said series of conveyor portions forming demarkations between each conveyor portion and the next of the series, at least certain ones of said series of conveyor portions extending to respective ones of said plural selective delivery means, at least one of said series of conveyor portions being adapted to carry concurrently plural items distributed along the path, and wherein said means for controlling said plural selective delivery means includes (a) storage means having a series of initially clear table positions each of which includes a line register, a timing register and a zone register, means responsive to a succession of items appearing at an entry position along said series of conveyor portions for making entries into the registers of successive ones of said series of table positions, respectively, said entries including a divert symbol in its lane register representing one of said plural selective delivery means as determined by said order selecting means and an initial amount in its timing register and a zone symbol in its zone register representing the first of said series of conveyor portions, (b) means responsive to items carried by at least one of said series of conveyor portions acting as a supply conveyor portion to the next following one of said series of conveyor portions acting as a receiving conveyor portion for making new entries into registers of one of said table positions that has a zone symbol in its zone register representing said supply conveyor portion, said new entries including a new initial amount in its timing register and a new zone symbol in its zone register representing said receiving conveyor portion, with the result that a group of table positions develop having the zone symbol representing any receiving conveyor portion that carries concurrently a plurality of items distributed along the path, (c) means operative during the operation of said conveyor means for periodically making cumulative unit changes in the timing registers of all table positions containing initial amounts and any cumulative unit changes, (d) table position locating and selecting means responsive to activating items reaching a control position at the end of each supply conveyor portion, including (1) means for locating each table position whose zone register contains a zone symbol representing said supply conveyor portion, and, for any group of table positions having a common zone symbol in their zone registers, (2) means for selecting that table position of the group whose timing register contains an amount differing most from the most recently entered initial amount among the amounts in the timing registers of said group of table positions, and (e) means selectively responsive to a divert symbol in the lane register of the located and selected table position for activating one of said plural selective delivery means.

10. Apparatus as in claim 8, including accounting means responsive to requirement said order selecting means for evidencing less-than-complete allocation of the items of each variety to each order as compared to the requirements for the items of each variety in each order, said accounting means controlling said order selecting means for limiting allocation of items of any variety to any order of the group to no more than the requirements for the respective varieties of items in the respective orders.

11. Apparatus as in claim 10, further including means for verifying delivery of each allocated item to the related order-assembly location, and means controlled by said verifying means for correcting the accounting means in case of non-delivery of an allocated item to the related order-assembly location.

12. Apparatus as in claim 8 or 1 wherein said conveyor means includes a succession of plural portions extending to respective ones of said plural selective delivery means and wherein said item-characterization registering means comprises a scanner in advance of all of said plural selective delivery means, said jointly responsive means including an indexable active table having at least as many table positions for data as separate items to be carried concurrently on the conveyor means, said jointly responsive means also including means for entering control data in such table positions for causing operation of selected ones of said plural selective delivery means and further including means responsive to the data in said active table positions for activating the selected ones of said plural selective delivery means.

13. Apparatus as in claim 8 or 1 wherein each said item-characterization registering means comprises a scanner disposed in advance of said plural selective delivery means for scanning items carried by the conveyor means, and wherein said conveyor means includes plural serially related conveyor portions for transporting items from the scanner along a path that extends to said plural selective delivery means in succession, further including prescribed time representing means for representing prescribed travel times of items traveling predetermined distances along said plural serially related conveyor portions, plural actual travel time representing means for representing actual times taken by items in traversing predetermined distances along said plural serially related conveyor portions, there being at least as many actual travel time representing means as items to be carried concurrently by the conveyor means, and means responsive to said prescribed time representing means and said plural actual travel time representing means for signalling excessive deviation of the actual travel time of any item traversing any of said predetermined distances from the prescribed travel times for items traveling those predetermined distances.

14. Apparatus as in claim 13 including an active table having at least as many active table positions as separate items to be carried concurrently by the conveyor means, said plural actual travel time representing means including respective pulse counters forming parts of said active table positions, respectively, and including a tach pulse generator coupled to and operable in coordination with a portion of said conveyor means for providing timing pulses to said pulse counters.

15. Apparatus as in claim 8 or 1 wherein each said package-characterization registering means comprises a scanner disposed in advance of said plural selective delivery means for scanning items carried by the conveyor means, and wherein said conveyor means includes plural serially related conveyor portions for transporting items from the scanner along a path that extends to said plural selective delivery means in succession, further including plural actual travel time representing means for representing the actual travel times taken, respectively, by plural items in successively traversing prescribed distances along said path, there being at least as many of said plural actual travel time representing means as separate items to be carried concurrently by the conveyor means, and means responsive to said plural actual travel time indicating means for signalling excessive time taken by any of the items in traversing any of said prescribed distances.

16. Apparatus as in claim 15 including an active table having at least as many active table positions as separate items to be carried concurrently by the conveyor means, said plural actual travel time representing means including respective pulse counters forming parts of said active table positions, respectively, and including a tach pulse generator coupled to and operable in coordination with a portion of said conveyor means for providing timing pulses to said pulse counters.

17. Apparatus as in claim 8 or 1 wherein each said item-characterization registering means comprises a scanner disposed in advance of said plural selective delivery means for scanning items carried by the conveyor means, and wherein said conveyor means includes plural serially related conveyor portions for transporting items from the scanner along a path that extends to said plural selective delivery means in succession, further including plural actual travel time representing means for representing the actual travel times taken by successive items in being transported by any of said plural serially related conveyor portions, there being at least as many of said plural actual travel time representing means as separate items to be carried concurrently by the conveyor means, plural detectors for signalling the arrival of items at discrete positions along the plural serially related conveyor portions, respectively, and means responsive to any of said plural detectors and to said plural actual time indicating means for signalling the absence of any item being transported along any of said plural serially related conveyor portions having an actual travel time of at least a predetermined minimum.

18. Apparatus as in claim 17 including an active table having at least as many active table positions as separate items to be carried concurrently by the conveyor means, said plural actual travel time representing means including respective pulse counters forming parts of said active table positions, respectively, and including a tach pulse generator coupled to and operable in coordination with a portion of said conveyor means for providing timing pulses to said pulse counters.

19. Apparatus for concurrently processing a group of orders each of which requires items of one or more varieties, by selectively distributing items in the orders to separate order-assembly locations related to the orders of the group, items of the same variety having a common characterization without regard to whether they appear in one or more of the orders and items of different varieties having different characterizations, said apparatus including i. conveyor means for carrying a series of items to be distributed to the separate order-assembly locations, said conveyor means including plural selective delivery means for directing items carried by the conveyor means selectively to the separate order-assembly locations;

ii. item registering means for registering the characterizations of the items carried by the conveyor means;

iii. order registering means including means for storing identifications of the orders of the group of orders to be processed concurrently and means for representing the net requirement for each variety of item in each of the orders, respectively, of the group to be processed concurrently, the stored order identifications and the represented net requirements for the respective varieties of items in the orders being related to each other, wherein the net requirement for any variety of item in any particular order is the requirement for that variety of item appearing in that order as reduced by operation of the apparatus;

iv. order selecting means jointly responsive to both said item registering means and one of the net requirements representing means in said order registering means for selecting one of the orders, if any, in said order registering means that has a net requirement for each specific item whose characterization is registered in said characterization registering means and thus allocating such item to the selected order, and v. means responsive to said order selecting means (a) for reducing the net requirement in the selected order for items of the same variety as said allocated item, and (b) for controlling said plural selective delivery means to direct each allocated item selectively to an order-assembly location related to the selected order.

20. Apparatus as in claim 19, wherein said item characterization registering means comprises a scanner disposed in advance of all of said plural selective delivery means, said apparatus further including means for verifying delivery of each allocated item to an order-assembly location related to the selected order, and means controlled by said verifying means for correcting the net requirement of that item as represented in the net requirement representing means of the selected order in case of nondelivery of such item to the order-assembly location related to the selected order.

21. Apparatus as in any of claims 1, 2, 7, 14, or 15 wherein said conveyor means includes a common conveyor portion for supplying items to said plural selective delivery means, and wherein said item-characterization registering means comprises a single scanner at said common conveyor portion.

22. Apparatus as in any of claims 1, 2, 7, 14, or 15 wherein said conveyor means includes a succession of plural portions extending to respective ones of said plural selective delivery means and wherein said item-characterization registering means comprises a scanner disposed along said conveyor means in advance of all of said plural selective delivery means.

23. An article tracking conveyor system, including plural selective delivery means distributed along a path and a series of conveyor portions distributed along said path, at least certain ones of said series of conveyor portions extending to respective ones of said plural selective delivery means, there being a series of control positions along said path forming demarkations between each of said series of conveyor portions and the next of the series, at least one of said series of conveyor portions being adapted to carry concurrently plural articles distributed along the path, and means for tracking articles carried along said path and for controlling said plural selective delivery means, the last-named means including (a) storage means having a series of initially clear table positions each of which includes a lane register, a timing register and a zone register, the storage means including means responsive to a succession of articles appearing at an entry position along said series of conveyor portions for making entries into the registers of successive ones of said series of table positions, respectively, said entries including a divert symbol in its lane register representing one of said plural selective delivery means, and an initial amount in its timing register and a zone symbol in its zone register representing the first of said series of conveyor portions;

(b) means responsive to articles carried successively by any of said series of conveyor portions acting as a supply conveyor portion to the next of said series of conveyor portions acting as a receiving conveyor portion for making new entries into the registers of one of said table positions that has a zone symbol in its zone register representing said supply conveyor portion, said new entries including a new initial amount in its timing register and a new zone symbol in its zone register representing said receiving conveyor portion, with the result that a group of table positions develop having a zone symbol representing any receiving conveyor portion that carries concurrently a plurality of articles distributed along the path;

(c) means operative during the operation of said series of conveyor portions for periodically making cumulative unit changes in the timing registers of all table positions containing initial amounts and any cumulative unit changes;

(d) table position locating and selecting means responsive to an activating article reaching a control position at the end of any particular supply conveyor portion including (1) means for locating each table position whose zone register contains a zone symbol representing said particular supply conveyor portion and, for any group of table positions having a common zone symbol in their registers, (2) means for selecting that table position among such a group whose timing register contains an amount differing most from the initial amount most recently entered therein among the amounts in the timing registers of such group of table positions; and (e) means selectively responsive to a divert symbol in the lane register of the located and selected table position for activating one of said plural selective delivery means.

24. An article tracking conveyor system, including a series of conveyor portions distributed along a path past a series of control positions forming the demarkations between each of said series of conveyor portions and the next of the series, at least one of said series of conveyor portions being adapted to carry concurrently plural articles distributed along said path, and means for tracking articles carried along said path including (a) storage means having a series of initially clear table positions each of which includes a timing register and a zone register, the storage means including means responsive to a succession of articles appearing at an entry position along said series of conveyor portions for making entries in the registers of successive ones of said series of table positions, respectively, said entries including an initial amount in its timing register and a zone symbol in its zone register representing the first of said series of conveyor portions;

(b) means responsive to articles carried successively by any of said series of conveyor portions acting as a supply conveyor portion to the next of said series of conveyor portions acting as a receiving conveyor portion for making new entries in the registers of one of said table positions that has a zone symbol in its zone register representing said supply conveyor portion, said new entries including a new initial amount in its timing register and a new zone symbol in its zone register representing said receiving conveyor portion, with the result that a group of table positions develop having a zone symbol representing any receiving conveyor portion that carries concurrently a plurality of articles distributed along the path;

(c) means operative during the operation of said series of conveyor portions for periodically making cumulative unit changes in the timing registers of all table positions containing initial amounts and any cumulative unit changes;

(d) table position locating and selecting means responsive to an activating article reaching a control position at the end of any particular supply conveyor portion including (1) means for locating each table position whose zone register contains a zone symbol representing said particular supply conveyor portion and, for any group of table positions having a common zone symbol in their registers, (2) means for selecting that table position among such a group whose timing register contains an amount differing most from the initial amount most recently entered therein among the amounts in the timing registers of such group of table positions; and (e) means, responsive to said table position locating and selecting means, for making new entries in registers of at least some of such table positions including new initial amounts in their respective timing registers and new zone symbols in their zone registers representing said receiving conveyor portion.

25. An article tracking conveyor system including conveyor means having a series of conveyor portions for conveying articles along a path, any one of said series of conveyor portions acting as a supply conveyor portion and the next-following one of said series of conveyor portions acting as a receiving conveyor portion, and means for tracking articles carried along said path by said series of conveyor portions, said tracking means including (a) storage means including a series of initially clear table positions each having a timing register and a zone register, the storage means including means for making entries into successive ones of said table positions in time with the appearance of successive articles at an entry position along said supply conveyor portion including for each table position a common zone symbol in its zone register representing said supply conveyor portion and an initial amount in its timing register, with the result that a group of table positions develop having a zone symbol representing said supply conveyor portion when plural articles distributed along said path are carried concurrently by said supply conveyor portion, (b) means operative during operation of said series of conveyor portions for making cumulative unit changes in the amounts in the timing registers of those table positions containing initial amounts and any cumulative unit changes;

(c) table position locating and selecting means responsive to an activating article reaching a control position along said supply conveyor portion to a control position spaced downstream of said entry position including (1) means for locating each table position whose zone register contains a zone symbol representing said supply conveyor portion and, for any group of table positions having such zone registers, (2) means for selecting that table position among the group whose timing register contains an amount differing most from the initial amount last entered in the timing registers of that group of table positions; and (d) means responsive to such location and selection of table positions for making new entries in registers of at least some of such table positions including new initial amounts in their respective timing registers and new zone symbols in their zone registers representing said receiving conveyor portion.

26. Apparatus as in any of claims 22-25 wherein the means for selecting one table position among a group of table positions having a common zone symbol in their zone registers comprises means for testing the timing registers among such group of table positions to identify any of them having an amount in its timing register which exceeds a predetermined difference from the initial amount last previously entered therein, said predetermined difference representing the minimum time for an article to be carried from said entry position to said control position.

27. Apparatus as in claim 26, further including means for signalling a maximum cumulative unit change from the initial amount entered into the timing registers of those table positions having a common zone symbol in their zone registers, for thereby revealing any excessively delayed package or article.

28. Article tracking conveyor apparatus comprising transporting means for carrying a succession of articles along a path wherein an article may fail for any reason to travel at or within a prescribed deviation from the speed of the transporting means, a series of detectors distributed along said path including a first detector and further detectors, a series of timers including at least as many timers as articles to be carried concurrently by said transporting means, means acting in response to successive articles reaching said first detector for initializing said timers successively, signalling means responsive to any of said timers attaining a time-interval representation exceeding a prescribed maximum, and means responsive to articles reaching said further detectors for re-initializing any of said timers whose time-interval representation exceeds a prescribed minimum, for tracking the articles in a manner that avoids accumulating the separate variations in the time of travel of an article from each of said detectors to the next in monitoring the speed of the articles and for signalling any removal or blockage of articles.

29. Article tracking conveyor apparatus comprising transporting means for carrying a succession of articles along a continuous path wherein an article may fail for any reason to travel at or within a prescribed deviation from the speed of the transporting means, a series of article detectors distributed along said path including an entry detector and a succession of zone detectors, a series of timers and a series of zone storing means related respectively to said timers including at least as many of such timers and zone storing means as articles to be carried concurrently by said transporting means, means triggered by each of a series of articles reaching said entry detector for initializing each of said timers in succession and for entering into each zone storing means related to the initialized timer a zone designation corresponding to the next zone detector along said path, means for signalling the occurrence of any of said timers exceeding a prescribed maximum time-interval representation, and means activated by respective ones of said zone detectors in response to articles carried by the transporting means for re-initializing any of said timers that has a stored zone designation corresponding to such activated zone detector and that has a time representation exceeding a prescribed minimum time representation and for changing the zone designation in the zone storing means related to such re-initialized counter to a designation representing the next-following zone detector along said path.

30. Article tracking conveyor means as in claim 29 further including selective discharge means activated under control of said zone detectors for directing articles selectively to plural discharge lanes, further including verifying detectors disposed along said plural discharge lanes, respectively, and means responsive to articles reaching said verifying detectors for resetting timers re-initialized in response to the respective zone detectors that activated said selective discharge means.

31. Article-storing means as in claim 30, including an active table having at least as many table positions as articles to be concurrently carried by said transporting means, each table position including a counter that comprises a respective one of said timers and is responsive to pulses from the tach pulse generator and each table position comprising one of said series of zone storing means, and each such table position including a means for storing an eject designation for selectively activating one of said selective discharge means.

32. Article-tracking conveyor means as in claim 29, including a tach pulse generator coupled to and operable in timed coordination with a portion of said transporting means, and an active table having at least as many table positions as articles to be concurrently carried by said transporting means, each table position including a counter that comprises a respective one of said timers and is responsive to pulses from the tach pulse generator and each table position comprising one of said series of zone storing means.

33. Article-tracking conveyor means as in claim 28, 29 or 30, including a tach pulse generator coupled to and operable in timed coordination with a portion of said transporting means, wherein each of said timers includes a pulse counter responsive to pulses from said tach pulse generator.

34. An article tracking conveyor system, including conveyor means for conveying successive articles along a path, a series of sensors located at spaced-apart positions distributed along said path, said sensors being disposed to be activated by articles carried by said conveyor means, said sensors including a first sensor at a starting position along said path and further sensors, said conveyor means being divided by said series of sensors into a series of conveyor portions, and means for tracking articles carried along said path by said conveyor means, said tracking means including (a) storage means including a series of initially clear table positions each having a timing register and a zone register, and means controlled by said first sensor for entering data in successive ones of said series of table positions, including for each of said table positions an initial amount in its timing register and, in its zone register, a zone symbol representing that one of said series of conveyor portions which next follows said first sensor;

(b) means operative during the operation of said conveyor means for periodically making cumulative unit changes in the timing registers of all table positions containing initial amounts and any cumulative unit changes;

(c) up-dating means responsive to each of said further sensors when activated by the articles carried by the conveyor means for making up-dating entries in at least certain ones of said series of table positions whose zone registers contain a zone symbol representing that conveyor portion which next-precedes the activated one of said further sensors, said up-dating entries including for each of said certain table positions a new initial amount in its timing register and, in its zone register, a zone symbol representing that one of said series of conveyor portions that next follows each activated one of said further sensors, with the result that a group of said table positions will develop having a common zone symbol in their zone registers when any of said conveyor portions that next follows any of said sensors carries a succession of articles distributed along said path, said tracking apparatus further including (d) means for selecting one table position of each group of table positions having a common zone symbol in their zone registers, said selecting means being operable in dependence on which of said group of table positions has an amount in its timing register that differs most from the initial amount most recently entered in the timing registers of that group of table positions, whereby to identify controlling table positions as being either table positions whose zone registers contain zone symbols differing from those of all other table positions or the table positions selected by said selecting means; and (e) means for limiting said up-dating means to making said up-dating entries in only said controlling table positions.

35. An article tracking conveyor system as in claim 34, wherein each of said table positions further includes a lane register and wherein said storage means includes means for entering a divert symbol in the lane register of each of a succession of said table positions receiving entries in its timing and lane registers, further including a plurality of article diverters corresponding, respectively, to divert symbols entered in said lane registers, said diverters being disposed along said conveyor means near respective ones of said further sensors, and means selectively responsive to the divert symbols of said controlling table positions identified as aforesaid in response to articles activating said further sensors for diverting such articles selectively from said series of conveyor positions.

36. An article tracking conveyor system as in claim 34 or 35, wherein said means for selecting one of said group of table positions comprises means for locating that table position whose timing register has an amount that differs from the initial amount entered into the timing registers of that group of table positions by at least a minimum amount that represents the shortest time as measured by said unit changes for an article to be transported to the next-following one of said further sensors by the conveyor portion represented by such common zone symbol.

37. Conveyor apparatus comprising transporting means for transporting a series of articles along a path, said transporting means being of a type that may allow slip to occur between the operation of the transporting means and the travel of the articles, a series of article detectors distributed along said path and separated from each other by respective segments of the transporting means, said article detectors including a first article detector and succeeding article detectors; a tach pulse generator operative in time with the transporting means; a series of tach pulse counters and a series of zone registers related to the tach pulse counters, respectively; means activated by the first of said article detectors in response to articles carried by the transporting means for initializing respective ones of said tach pulse counters and for entering, into the related zone registers, zone designations corresponding to the first of said segments of said transporting means, means for identifying those tach pulse registers whose tach pulse counts are within a prescribed range, and reset means responsive to each of said succeeding article detectors in response to the articles carried by the transporting means for again initializing particular ones of said tach pulse registers whose related zone registers have entries corresponding to the next-preceding segments of the transporting means, respectively, and whose counts are within a prescribed range and for entering, into the related zone registers, zone designations corresponding to the respective next-following segments of the transporting means.

38. Conveyor apparatus as in claim 37, wherein said means for identifying those tach pulse counters whose counts are within a prescribed range includes means for detecting those tach pulse counters whose tach pulse counts exceed a minimum and signalling means responsive to any of said tach pulse counters whose count exceeds a maximum.

39. Conveyor apparatus as in claim 37 or 38 wherein each of said means for initializing said tach pulse counters is adapted to establish a starting count related, respectively, to the extent of the segment from each of said article detectors to the next-following one of said article detectors, respectively.

40. Conveyor apparatus as in either claims 37 or 38 further including plural diverters for diverting articles selectively from said transporting means, divert registers related, respectively, to said tach pulse registers and their related zone registers, means for entering divert designations selectively into said divert registers, and control means responsive to said article detectors for selectively activating said diverters in dependence on divert designations in said divert registers related to those tach pulse counters whose counts are within the prescribed range and which are also related to zone registers having zone designations corresponding to the segments of the transporting means that next precede such article detectors.

41. Apparatus as in claim 40 wherein said article transporting means comprises a series of belt conveyors and a series of diverters interposed between the belt conveyors, each of said belt conveyors and said diverters having separate drive motors.

42. A method of concurrently processing a group of orders by assembling varieties of items required in the orders at separate order-assembly locations related to said orders, all items of each variety having the same characterization without regard to whether they appear in one or more of the orders and items of different varieties having mutually different characterizations, wherein one or more orders may have requirements for any particular variety of item, said method including the steps of
  i. storing the requirements of the orders of the group including stored identifications of the orders and stored characterizations of the varieties of items required in the orders, the item characterizations and the order identifications as stored being related to each other,
  ii. loading a series of items that may be required in the orders on a sorting conveyor having plural selective delivery means for directing items on the conveyor selectively to said order-assembly locations;
  iii. registering the characterization of each of the items on the conveyor;
  iv. comparing the registered characterization of each specific item on the conveyor and the stored characterizations of the varieties of items required in the stored orders;
  v. based on such comparison, selecting one of the orders, if any, among one or more of the stored orders having a requirement for said specific item, thus allocating such item to the selected order; and
  vi. selectively controlling said selective delivery means in accordance with such order selection to cause such item on the conveyor to be directed selectively to one of said order-assembly locations that is related to said selected order.

43. The method as in claim 42, including the steps of (vi.) accounting for items of the respective varieties allocated pursuant to step (v.) to the orders, respectively, and (vii.) limiting each new allocation of an item pursuant to step (v.) so that, with respect to items of the same variety in any selected order, the total of the allocations will not exceed the stored requirement.

44. A method of concurrently processing a group of orders by assembling varieties of items required in the orders at separate order-assembly locations related to said orders, all items of each variety having the same characterization without regard to whether they appear in one or more of the orders and items that are of different varieties having mutually different characterizations, wherein one or more orders may require items of the same variety; said method including the steps of
  i. representing the order identifications and the characterization of and the net requirement for items of each variety in each of the orders, so that a plurality of net requirements for the same variety of item will be represented when there are net requirements for such variety of item in a plurality of the orders, a net requirement being the requirement for any item appearing in any of said orders as reduced up to any point in processing of the group of orders;
  ii. loading items that may be required in the orders on a sorting conveyor having plural selective means for directing items on the conveyor selectively to said order-assembly locations;
  iii. registering the characterization of each of the items on the conveyor;
  iv. with respect to each item loaded on the conveyor, comparing the registered characterization thereof with the represented characterizations of the varieties of items in the orders;
  v. based on such comparison, selecting one of said orders, if any, for which there is a net requirement for the variety of such item, thus allocating such item to the selected order; and
  vi. selectively controlling said selective directing means in accordance with such order selection to cause the allocated items on the conveyor to be directed selectively to said order-assembly locations related to said selected orders.

45. The method as in claim 44, including, in coordination with each allocation of an item to an order pursuant to step (v.), the further step (vi.) of reducing the corresponding net requirement for that variety of item in that order, thereby preventing allocation of an item to an order after its net requirement has been reduced to zero.

46. The method as in claim 45, including the further steps of (vii.) verifying discharge of items to order-assembly locations related to the selected orders, and (viii.) correcting net requirements as reduced pursuant to step (vi.) for the items previously allocated to the orders pursuant to step (v.) that are not verified pursuant to step (vii.) as having been discharged in accordance with their allocations.

47. A method of concurrently processing a group of orders by assembling, at separate order-assembly locations related to the orders of the group, items of the varieties required in the orders, wherein one or more of the orders may require items of the same variety, such items being supplied separately or as packages of plural items of the same variety, items of different varieties having mutually different characterizations and items of any one variety having the same characterization without regard to whether they appear in one or more of the orders, said method including the steps of i. registering the orders so as to include stored order identifications and representations of the variety and quantity requirements for each item in each order, the stored order identifications and the stored requirements representations being related to each other;

ii. loading items on a sorting conveyor having means for discharging the items from the conveyor selectively to said order-assembly locations;

iii. registering the characterizations of the items on the sorting conveyor;

iv. as to each of the items whose characterization has been registered, selecting one of said orders, if any, having a stored representation of a variety of item corresponding to the registered characterization of such item on the conveyor but only if the quantity requirement for that item has not yet been met at any point in the performance of the method, thus ascertaining that such item is required by the selected order;

v. accounting for items of each variety allocated to each order and discharging the required items from the conveyor selectively at said order-assembly locations related to the selected orders; and vi. limiting the selection of orders and allocation of items to said orders so that the items of any variety allocated to any order do not exceed the stored representation of the requirement for that variety of item in that order.

48. The method as in claim 42, including the further steps of (vii.) verifying selective discharge, pursuant to step v.(b), of items to the order-assembly locations related to the allocations, and (viii.) correcting the accounting pursuant to step v.(a) for allocated items that are not verified as having been delivered to said order-assembly locations related to the selected orders.

* * * * *